United States Patent

Nishizawa

[11] Patent Number: 6,100,908
[45] Date of Patent: Aug. 8, 2000

[54] IMAGE FORMING DEVICE

[75] Inventor: Katsuhiko Nishizawa, Saitama, Japan

[73] Assignee: Fuji Xerox Co., Ltd., Tokyo, Japan

[21] Appl. No.: 09/177,106

[22] Filed: Oct. 22, 1998

[30] Foreign Application Priority Data

Oct. 23, 1997 [JP] Japan ................................ 9-291406

[51] Int. Cl.[7] .............................. B41J 2/385; G03G 13/04
[52] U.S. Cl. ............................................................. 347/133
[58] Field of Search .................................... 347/129, 132, 347/133, 134, 135

[56] References Cited

U.S. PATENT DOCUMENTS

| 4,144,539 | 3/1979 | Davie et al. | 347/133 |
| 4,443,695 | 4/1984 | Kitamura. | |
| 5,463,410 | 10/1995 | Uchiyama et al. | 347/133 |

FOREIGN PATENT DOCUMENTS

| 61-166085 | 7/1986 | Japan. |
| 2-98462 | 4/1990 | Japan. |

*Primary Examiner*—Sandra Brase
*Attorney, Agent, or Firm*—Finnegan, Henderson, Farabow, Garrett & Dunner, L.L.P.

[57] ABSTRACT

Driving electric current values of a semiconductor laser when detected light amount values are equal to each of five light amount values having respectively different magnitudes are detected. Thus, five detecting points relating to a light amount value-driving electric current value characteristic are obtained. A differential efficiency $\eta$ at an interval between two adjacent detecting points is calculated. For example, a differential efficiency $\eta 1$ is calculated from an adjacent detecting point and a differential efficiency $\eta 2$ is calculated from another adjacent detecting point. Further, values of the differential efficiencies are displayed on a display so that an operator can recognize an exact deteriorated state of an LD from the values of the differential efficiencies.

21 Claims, 19 Drawing Sheets

LIGHT OUTPUT VERSUS MONITOR ELECTRIC CURRENT CHARACTERISTIC

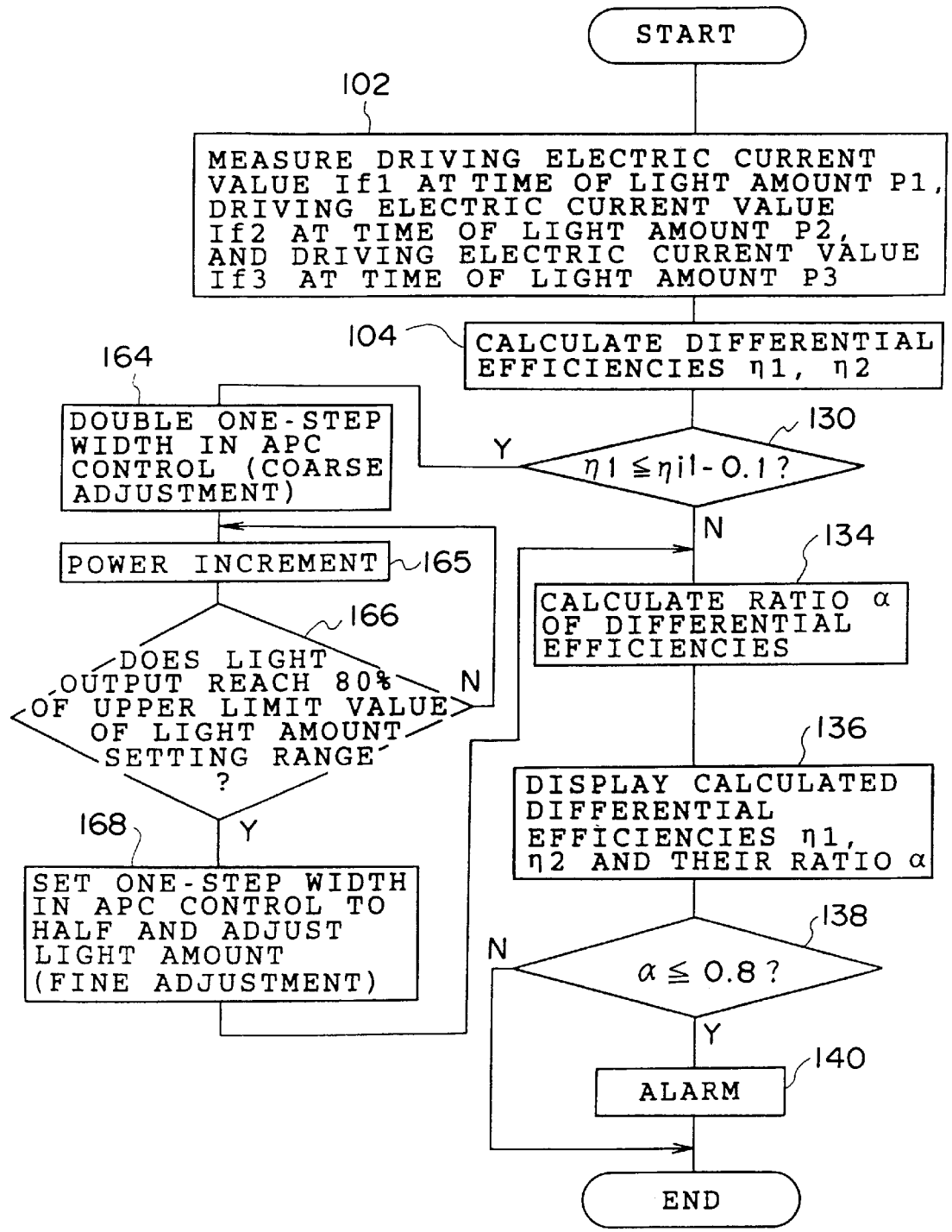

IMAGE FORMING DEVICE

BACKGROUND OF THE INVENTION

1. Field of the Invention

The present invention relates to an image forming device, and more particularly relates to an image forming device which has a laser beam emitting portion for emitting a laser beam according to a driving electric current and forms an electrostatic latent image on an image carrier by deflecting and scanning the laser beam emitted from the laser beam emitting portion.

2. Description of the Related Art

In a conventional image forming device such as a laser beam printer, a copier, or the like, a laser beam is emitted and not emitted by a laser exposure device in accordance with an output image signal, and the uniformly-charged surface of a photosensitive body is exposed by the emitted laser beam so that an electrostatic latent image is formed on the photosensitive body. This electrostatic latent image is developed by toner development and the obtained toner image is transferred onto a recording medium such as a sheet of paper, or the like, and is then fixed to the recording medium. Thus, an image is formed by such a so-called electrophotographic system.

A semiconductor laser (a laser diode, hereinafter called an LD) is generally used as the light source of the laser exposure device for forming such an image on a photosensitive body. In this LD, the laser beam is modulated and outputted in accordance with an image to be formed. A light receiving element is provided at an image-write side on a deflecting-scanning optical path, and horizontal synchronization is established by detecting the laser beam passing through this light receiving element so that writing timing of the image (namely, the timing of the emission of the laser light) is determined.

After the laser beam is deflected by a rotary polygon mirror, the beam diameter and the like are corrected by an optical system. While the horizontal synchronization is established by the light receiving element, the laser beam is focused and is scanned on the photosensitive body so that the latent image of a desired output image is formed on the photosensitive body.

In such an image forming device, in order for the light output of the laser beam to be equal to a required light output value, a monitor voltage corresponding to the light output and a desired voltage reference value (Vref) are successively compared with each other, and a driving electric current of the LD is controlled such that the monitor voltage is equal to the voltage reference value. Such control is called automatic light output adjustment (APC: Auto Power Control) and is executed in a general laser printer or a general copier so that a desired output image is formed.

Characteristics of the LD used as a light source will next be described. The relation of the light output to a supplied driving electric current is generally provided as the LD characteristics as shown by the graph of FIG. 6. In FIG. 6, there is no laser oscillation until a certain threshold electric current (Ith). When an electric current exceeding this threshold electric current (Ith) is supplied, the light output L and the magnitude of the supplied electric current I show a linear characteristic (I-L characteristic).

Deterioration of this I-L characteristic will be explained here. This I-L characteristic mainly deteriorates due to the following three factors.

A first factor is a characteristic shift caused by temperature. As shown by the graph of FIG. 6, in accordance with a rise in temperature of the LD, the threshold electric current (Ith) is increased and the slope of the I-L curve in a laser oscillating area slightly decreases.

A second factor is a characteristic shift caused by an external factor. As an external factor applied from the exterior if the LD, for example, an excessive electric current, exceeding a rated electric current, such as a surge, flows into the LD for some reason. Thus, a light output of power corresponding to the excessive electric current value is momentarily turned on within a chip of the LD. At this time, a chip end face is instantly melted. Depending on the degree of melting, same LDs may be broken whereas same LDs may be relatively slightly damaged and able to normally operate in an usual operation.

However, the light emitting efficiency of an LD whose end face has melted is reduced in comparison with its initial state even if there is only slight deterioration. Namely, a large amount of the driving electric current for obtaining the same light output is required in comparison with the initial state (see FIG. 5) and a heating amount is also increased. At this time, as can be seen from the above characteristic of the driving electric current I and the light output L (see FIG. 6), a higher driving electric current is required as the temperature rises. Thus, the light emitting efficiency is further reduced. The deterioration of the LD is advanced by this repetition so that the LD is broken. With respect to the above I-L characteristic, as shown in FIG. 4, the I-L curve gradually becomes horizontal at the supplied electric current (driving voltage) axis side with each application of static electricity. In addition to this, the linearity of the I-L curve is also lost in a high output area. Namely, a characteristic in which the slope of the I-L curve decreases (bows down) in the high output area is exhibited.

A third factor is deterioration with the passage of time. The driving electric current value for obtaining the same light emitting amount gradually increases due to a cumulative time for supplying the electric current to the LD. Similarly to the aforementioned state of deterioration caused by an external factor, the curve of the I-L characteristics also shows a characteristic of gradually becoming horizontal as shown by the graph of FIG. 5.

Further, in addition to these three factors, there is also dispersion in LD elements themselves.

The following monitoring techniques of LD life span have been proposed conventionally. For example, the following technique is described in Japanese Patent Application Laid-Open (JP-A) No. 61-166085. Namely, an upper limit value of the driving electric current value for obtaining a required light output is set in advance in a printer, a copier, or the like. This driving electric current value is monitored when the driving electric current value is increased to obtain the required light output. When the driving electric current value exceeds the upper limit value, a judgement is made that it is the life span the LD and a warning is given.

Japanese Patent Application Laid-open (JP-A) No. 2-98462 describes the following technique. Namely, a threshold electric current value at a power turning-on time is stored. Further, at an image forming processing time, the driving electric current value at the time when a light output value of 80% of a maximum value of a required light output for image forming processing is obtained is stored. A judgement is made that it is the life span of the LD when the difference between the driving electric current value and the threshold electric current value is larger than a predetermined reference value for judgement.

However, the LD life span is judged on the basis of a preset stored driving electric current value in the technique proposed in Japanese Patent Application Laid-Open (JP-A) No. 61-166085. Therefore, it is difficult to detect an exact deteriorated state due to influences such as a change in temperature within the image forming device during operation of the apparatus, dispersion of each apparatus, and the like. In the technique proposed in Japanese Patent Application Laid-Open (JP-A) No. 2-98462, the difference between the two electric current values at the power turning-on time and the image forming processing time is determined, but there is a high possibility of different temperatures within the image forming device at the power turning-on time and the image forming processing time. Accordingly, the influence of the change in temperature within the image forming device is included in the difference between the two electric current values. Therefore, it is difficult to detect the exact deteriorated state.

Further, in the prior art examples, only the warning of the LD life span is given in advance, but the life span of the image forming device cannot substantially be extended when the LD is deteriorated by a certain cause. In actuality, even if the warning of the LD life span is given in advance, if the light output at the initial light amount setting time of the LD is not increased up to the prescribed light amount required to write an image, the image forming function is stopped at that time, and the image forming device cannot operate normally until a built-in optical scanner or the like is replaced.

When the initial light amount of the LD is adjusted, the driving electric current is adjusted such that the light output becomes equal to a desirable value, while the driving electric current is increased by a predetermined unit light amount adjusting width. As the deterioration of the LD is advances, the slope of the above-discussed I-L curve decreases. Accordingly, the number of adjustments of the initial light amount of the LD increases.

SUMMARY OF THE INVENTION

In consideration of the above facts, an object of the present invention is to provide an image forming device capable of detecting an exact deteriorated state of an LD and executing control in accordance with to the detected exact deteriorated state.

To achieve the above object, an image forming device in the present invention comprises an optical scanner which has a laser beam emitting portion for emitting a laser beam in accordance with a predetermined driving electric current by the driving electric current being supplied to the laser beam emitting portion, and which forms an electrostatic latent image on an image carrier by deflecting and scanning the light emitted from said laser beam emitting portion; a light amount detector for detecting a light amount emitted from said laser beam emitting portion; a calculator, and when a plurality of driving electric currents having respectively different magnitudes are supplied to the laser beam emitting portion, said calculator, on the basis of a plurality of light amount values which have respectively different magnitudes and which are detected by said light amount detector, calculates a differential efficiency expressed by a ratio of one difference between a driving electric current and a light amount value to another difference, or calculates a ratio of differential efficiencies; and an announcing device for announcing a value of the differential efficiency or a value of the ratio of the differential efficiencies calculated by said calculator.

In the image forming device of the present invention, the optical scanner deflects and scans the light emitted from the laser beam emitting portion (e.g., a semiconductor laser or the like) so that an electrostatic latent image is formed on the image carrier. In such an image forming device, when a plurality of driving electric currents having respectively different magnitudes are supplied to the laser beam emitting portion, the calculator calculates the differential efficiency which is expressed by a ratio of one difference between a driving electric current and a light amount value to another difference, or calculates a ratio of differential efficiencies (when plural differential efficiencies are obtained), from a plurality of light amount values which have respectively different magnitudes and which are emitted from the laser beam emitting portion, i.e., from a plurality of light amount values which have respectively different magnitudes and which are detected by the light amount detector.

Here, for example, the calculator may obtain plural light amount values having respectively different magnitudes and detected by the light amount detector each tome the plural driving electric currents having respectively magnitudes are supplied to the laser beam emitting portion. The calculator may also obtain plural driving electric current values having respectively different magnitudes when these values are adjusted to become the plural light amount values having respectively different magnitudes.

For example, in a characteristic shown in FIG. 11 showing the relationship between a driving electric current value and a monitor voltage corresponding to a light amount value, a driving electric current value of the laser light emitting portion at the time when the detected light amount value is equal to each of five light amount values is detected. Thus, five detecting points A1, A2, A3, A4, A5 are obtained. Then, a differential efficiency $\eta$ at an interval between two adjacent detecting points, i.e., (the difference in the light amount values/the difference in the driving electric current values) is calculated. In FIG. 11, (the difference in the monitor voltages corresponding to the light amount values/the difference in the driving electric current values) is obtained. The differential efficiency $\eta$ may thus be calculated by using a predetermined physical amount (here, a voltage value) corresponding to the light amount value.

Concretely, a differential efficiency $\eta 1$ is calculated from detecting points A1 and A2 in FIG. 11. A differential efficiency $\eta 2$ is calculated from detecting points A2 and A3 in FIG. 11. A differential efficiency $\eta 3$ is calculated from detecting points A3 and A4 in FIG. 11. A differential efficiency $\eta 4$ is calculated from detecting points A4 and A5 in FIG. 11.

The value of the differential efficiency or the ratio value of differential efficiencies calculated in this way is announced by the announcing device so that an operator or the like can refer to these values. For example, as the method if output of these values, these values may be displayed on a display, or may be print-outputted onto a paper sheet, or may be announced by a sound.

As mentioned above, as deterioration of the laser beam emitting portion progresses, the slope of a characteristic curve of the light amount value driving electric current value characteristic decreases, and the characteristic curve is bent, and the bending degree thereof becomes severe as shown in FIGS. 4 and 11. Namely, it can be said that the value of the differential efficiency and the value of the ratio of differential efficiencies calculated as described above are values correlating to the degree of advancement of the deterioration of the laser beam emitting portion.

Accordingly, the operator can recognize an exact deteriorated state of the laser beam emitting portion by outputting of the value of the differential efficiency or the value of the ratio of differential efficiencies calculated as described above. Concretely, the operator can recognize that the laser beam emitting portion is in a deteriorated state by the value of the differential efficiency changing from its initial value by a predetermined value or more, or by the value of the ratio of differential efficiencies changing from its initial value "1" by a predetermined value or more.

Here, the value of the differential efficiency and the value of the ratio of differential efficiencies calculated as described above show the deteriorated state of the laser beam emitting portion. However, the differential efficiency or the differential efficiency ratio is calculated on the basis of plural light amount values having respectively different magnitudes and detected when the plural driving electric currents of respectively different magnitudes are supplied to the laser beam emitting portion. Accordingly, the calculated differential efficiency or differential efficiency ratio is a value from which are removed influences such as dispersion of each image forming device, the temperature of the place at which the apparatus is provided, and the like. Therefore, the exact deteriorated state of the laser beam emitting portion can be detected. Accordingly, the operator can more exactly recognize the deteriorated state.

When driving electric currents of different magnitudes are supplied to the laser beam emitting portion, it is desirable that an upper limit value of the range of light amount values detected by the light amount detector is set to be larger than an upper limit value of the range of light amount values set for image forming processing at the image forming device. For example, as shown in FIG. 11, it is desirable to detect light amount values of the laser beam emitting portion at detecting points A5, A6 in a light amount region higher than a light amount setting range (where the monitor for voltage is from 1 V to 2 V).

As clearly seen from FIGS. 4 and 11, bending (a state of bowing down) of the characteristic curve when deteriorated is particularly notable in regions where the light output is high. Accordingly, the bending of the characteristic curve, i.e., the deterioration of the laser beam emitting portion, can be more clearly detected by detecting the light amount value in a region where the light output is high and calculating the differential efficiency or the ratio thereof.

It is particularly desirable that at least two light amount values (e.g., detecting points A5, A6, or the like), which are greater than the upper limit value of the range of light amount values set for the image forming processing at the image forming device, are included among the plural light amount values having respectively different magnitudes and detected by the light amount detector. Thus, the bending of the characteristic curve, i.e., the deterioration of the laser beam emitting portion, can be more clearly detected by calculating the differential efficiency or the ratio thereof from at least two light amount values which are greater than the upper limit value of the range of light amount values set for the image forming processing at the image forming device. However, no light amount greater than the upper limit value of the set light amount values exceeds an absolute maximum rated light output of the laser beam emitting portion.

As shown in FIG. 11, when the laser beam emitting portion approaches the deteriorated state, the slope of the I-L curve is smaller than the slope of the I-L curve in a non-deteriorated state in the region higher than the upper limit value of the range of light amount values set for the image forming processing. Accordingly, from the differential efficiency or the ratio thereof calculated from the light amount values detected by the light amount detector in the region higher than the upper limit value of the range of light amount values set for the image forming processing, it recognized whether the laser beam emitting portion is close to a deteriorated state.

Here, the announcing device may announce that the laser beam emitting portion is close to a deteriorated state when the differential efficiency or the ratio of differential efficiencies, which are calculated by the calculator on the basis of at least two light amount values greater than the upper limit value of the range of light amount values set for image forming processing, is smaller than a predetermined value. Thus, it is possible to announce that the laser beam emitting portion is close to a deteriorated state.

When the deterioration of the laser beam emitting portion is recognized (i.e., when the value of the differential efficiency has changed by a predetermined value or more from its initial value, or when the value of the ratio of differential efficiencies has changed by a predetermined value or more from its initial value), the announcing device may announce to the operator or the like that the laser beam emitting portion has deteriorated, so that the operator or the like may reliably recognize the situation that the laser beam emitting portion has deteriorated.

It is desirable to provide at the image forming device a light amount reference value setting means for resetting a light amount reference value predetermined at the time of initial light amount adjustment of the laser beam emitting portion to be low when the value of the differential efficiency has changed by a predetermined value or more from its initial value or when the value of the ratio of differential efficiencies has changed by a predetermined value or more from its initial value, in order to avoid a situation in which the deterioration of the laser beam emitting portion progresses as mentioned above and the light amount of the laser beam emitting portion does not rise up to a predetermined light amount setting level required for image forming processing at an initial light amount setting stage such as start-up of the image forming device or the like.

This light amount reference value setting means resets the predetermined light amount reference value at the time of initial light adjustment of the laser beam emitting portion to be low when deterioration of the laser beam emitting portion is recognized (i.e., when the value of the differential efficiency has changed by a predetermined value or more from its initial value, or when the value of the ratio of the differential efficiencies has changed by a predetermined value or more from its initial value). Thus, it is possible to avoid a situation in which the light amount of the laser beam emitting portion does not rise up to the light amount setting level even when a maximum driving electric current is supplied to the laser beam emitting portion at the time of initial light amount adjustment of the laser beam emitting portion. Namely, a situation in which functioning of the image forming device stops can be avoided, and the life span of the image forming device can be extended.

However, when there is a fear that the exposure amount of the image carrier will be reduced and the density of the image to be firmed will be reduced due to the light amount reference value at the time of initial light amount adjustment of the laser beam emitting portion being set low, it is desirable to adjust the developing bias voltage of a developing device by a developing bias adjusting means so that the density of the image to be formed will not be lowered (will be higher than predetermined value). Thus, while a situation in which the functions of the image forming device are stopped is avoided, a reduction in density of the image to be formed can also be avoided.

As mentioned above, whether the laser beam emitting portion is close to a deteriorated state is recognized from the differential efficiency or the ratio thereof which are calculated from the light amount value detected by the light amount detector in an region greater than the upper limit value of the range of the light amount values set for image forming processing. Accordingly, when plural driving electric currents of respectively different magnitudes are supplied to the laser beam emitting portion, on the basis of at least two light amount values which are detected by the light amount detector and which are greater than the upper limit value of the range of the light amount values set for image forming processing, the differential efficiency, which is expressed by the ratio of one difference between a driving electric current and a eight amount value to the other difference, or a ratio of such differential efficiencies may be calculated. Further, when the calculated differential efficiency is smaller than a predetermined value or the ratio of differential efficiencies is smaller than a predetermined value, the predetermined light amount reference value at the time of initial light amount adjustment of the laser beam emitting portion may be reset to be low. In this case as well, a situation in which the functions of the image forming device are stopped can be avoided, and the life span of the image forming device can be extended. Since the light amount reference value is reset to be low and the life span of the image forming device is extended in the deteriorated state of the laser beam emitting portion, the life span of the image forming device can be further extended.

However, in this case, when there is the fear that the exposure amount of the image carrier will be reduced and the density of an image to be formed will be reduced due to the light amount reference value at the time of initial light amount adjustment of the laser beam emitting portion being set to be low, it is desirable to adjust the developing bias voltage of the developing device by the developing bias adjusting means so that the density of the image to be formed is not lowered. Thus, a situation in which the functions of the image forming device are stopped can be avoided and a reduction in density of the image to be formed can be avoided, from a state in which the laser beam emitting portion is close to a deteriorated state.

When the deterioration of the laser beam emitting portion progresses, the driving electric current value of the laser beam emitting portion, which is for setting the light amount to a predetermined light amount at an initial light amount setting stage such as a start-up time of the image forming device or the like, is increased. For example, in the light output valuedriving electric current value characteristic in FIG. 5, when the characteristic S0 in an initial state and the characteristic S1 after the passage of time $t_0$ are compared with each other, the driving electric current value for obtaining a light output value $P_0$ is Iop(0) in the initial state, but changes to Iop($t_0$) after the time $t_0$ has passed.

Accordingly, if a unit light amount adjusting width is constant at the time of adjustment of the light amount at the initial light amount setting stage of the laser beam emitting portion (i.e., the above-mentioned APC control), the time for raising the light amount of the laser beam emitting portion up to a predetermined light amount is lengthened.

Therefore, it is desirable to adjust an initial light amount of the laser beam emitting portion by increasing a predetermined unit light amount adjusting width by using a light amount adjusting control means when the deterioration of the laser beam emitting portion is recognized (i.e., when the value of the differential efficiency is changed by a predetermined value or more from its initial value, or when the value of the ratio of differential efficiencies is changed by a predetermined value or more from its initial value).

Thus, the time required for the light amount control can be shortened regardless of the deteriorated state of the laser beam emitting portion, so that the cumulative turned-on time of the laser beam emitting portion can be correspondingly shortened. Further, at the time of start-up of the image forming device, it is possible to correspondingly shorten the time (so-called FCOT or FPOT) required until an output image on a first page is outputted. Namely, the image forming device can be operated at high speed.

Further, a lower limit value of a light amount detecting range is set to be smaller than a lower limit value of the range of light amount values set for image forming processing. The unit light amount adjusting width is increased at an early point in time at which the differential efficiency is calculated from light amount values in a light amount region lower than the range of the light amount values. Thus, it is possible to further shorten the time for increasing the light amount of the laser beam emitting portion up to a target light amount of the APC control.

Here, the light amount adjusting means may coarsely adjust an initial light amount of the laser beam emitting portion at the increased unit light amount adjusting width until the light amount of the laser beam emitting portion becomes close to a target value (e.g., an upper limit value) within the range of light amount values set for image forming processing in the image forming device. Further, the light amount adjusting means may finely adjust the initial light amount of the laser beam emitting portion at a unit light amount adjusting width smaller than the increased unit light amount adjusting width when the light amount of the laser beam emitting portion is close to the target value. Since coarse and fine adjustments are made, the light output of the laser beam emitting portion can be rapidly and exactly set to the target value.

The light amount adjusting means may also carry out coarse adjustment on the basis of the value of the differential efficiency or the value of the ratio of the differential efficiencies by supplying a predetermined driving electric current to the laser beam emitting portion in accordance with the value of the differential efficiency or the value of the ratio of the differential efficiencies in order for the light amount emitted from the laser beam emitting portion to become a target value within the range of light amount values set for image forming processing in the image forming device. Thus, when coarse adjustment is made, the predetermined driving electric current is supplied to the laser beam emitting portion in accordance with the value of the differential efficiency or the value of the ratio of the differential efficiencies for setting the target value. Thus, the light output of the laser beam emitting portion can be rapidly set to the target value.

In this case, the value of the differential efficiency or the value of the ratio of the differential efficiencies for determining the driving electric current may be a value calculated by the calculator on the basis of light amount values smaller than a lower limit value of the range of light amount values set for the image forming processing. Thus, since the value of the differential efficiency or the value of the ratio of the differential efficiencies is calculated on the basis of light amount values smaller than the lower limit value of the range of light amount values set for the image forming processing, the aforementioned driving electric current can be determined at an early time at which the driving electric current begins to be supplied to the laser beam emitting portion, and the light output of the laser beam emitting portion can be more rapidly set to the target value.

When the deterioration of the laser beam emitting portion is recognized (i.e., when the value of the differential efficiency is changed by a predetermined value or more from its initial value, or when the value of the ratio of the differential efficiencies is changed by a predetermined value or more from its initial value), it is desirable that the deterioration of the laser beam emitting portion is announced by an announcing device to an operator or the like so that the situation that the laser beam emitting portion has deteriorated can be reliably recognized by the operator or the like.

The calculator may calculate the aforementioned ratio of differential efficiencies by calculating a ratio of one differential efficiency to a differential efficiency other than a differential efficiency which is adjacent to this one differential efficiency. Namely, for example, when the initial state in FIG. 11 is explained as an example, when one differential efficiency is calculated from detecting points A1 and A2, the ratio of differential efficiencies may be calculated from a ratio of this one differential efficiency to a differential efficiency other than the differential efficiency adjacent to this one differential efficiency (the differential efficiency calculated from detecting points A2, A3), e.g., a differential efficiency calculated from detecting points A3, A4, a differential efficiency calculated from detecting points A4, A5, a differential efficiency calculated from detecting points A5, A6, or the like.

Thus, the aforementioned ratio of differential efficiencies is calculated by determining a ratio of one differential efficiency to a differential efficiency other than a differential efficiency adjacent to this one differential efficiency. Accordingly, the deteriorated state of the laser beam emitting portion can be more clearly calculated. In particular, the further apart the one differential efficiency and the differential efficiency other than a differential efficiency adjacent to the one differential efficiency, the more clearly the deteriorated state of the laser beam emitting portion can be calculated. Namely, as the deteriorated state progresses from deteriorated state ① to deteriorated state ② to deteriorated state ③, the deteriorated state of the laser beam emitting portion can be more clearly calculated by the ratio of the differential efficiency determined from points corresponding to the detecting points A1, A2 and the differential efficiency determined from points corresponding to the detecting points A4, A5, than by the ratio of the differential efficiency determined from points corresponding to the detecting points A1, A2 and the differential efficiency determined from points corresponding to the detecting points A3, A4. Namely, it is desirable that one differential efficiency is determined from a driving electric current and a light output on a small value side, and a differential efficiency, other than a differential efficiency adjacent to this one differential efficiency, is determined from a driving electric current and a light output on a large value side.

BRIEF DESCRIPTION OF THE DRAWINGS

FIG. 19 is a flow chart showing an example of a control routine in a modified example of the third embodiment.

DESCRIPTION OF THE PREFERRED EMBODIMENTS

Various kinds of embodiments of the invention will next be explained.

First Embodiment

A first embodiment will first be explained.

Schematic structure of image forming device

Figure 1:
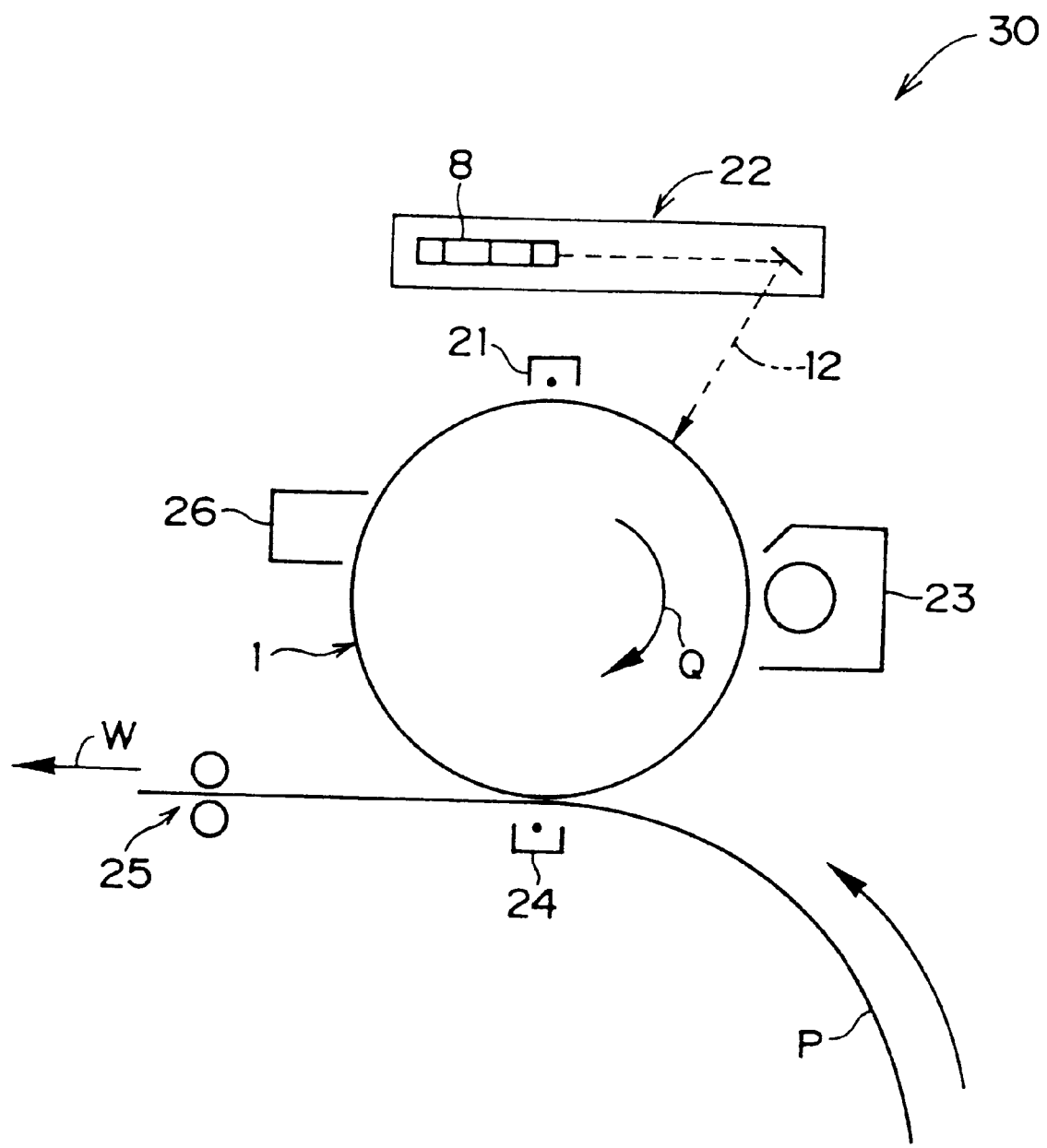
FIG. 1 is a view of the schematic structure of an image forming device.

FIG. 1 is a view showing the structure of a main portion of an image forming device 30 in this embodiment. As shown in this FIG. 1, a photosensitive drum 1 as an image carrier is arranged in the image forming device 30 and is rotated at a predetermined angular velocity in the direction of an arrow Q in FIG. 1. A charger 21, a developing device 23, a transfer device 24 and a cleaner 26 are sequentially arranged along an outer circumference of the photosensitive body 1 in the vicinity of an outer circumferential portion of the photosensitive drum 1. An optical scanner 22 is arranged above the photosensitive drum 1 and scans a surface of the photosensitive drum 1 by a laser beam modulated in accordance with data of a formed image. A scanning position of the laser beam provided by the optical scanner 22 is set between a charging position provided by the charger 21 and a developing position provided by the developing device 23.

The surface of the photosensitive drum 1 charged by the charger 21 is scanned and exposed by the laser beam from the optical scanner 22 modulated in accordance with the data of the formed image so that an electrostatic latent image is formed. Further, This electrostatic latent image is developed by the developing device 23 and a toner image corresponding to the electrostatic latent image is formed on the surface of the photosensitive drum 1.

In contrast to this, a paper sheet P is conveyed to a nip portion between the photosensitive drum 1 and the transfer device 24 along a predetermined path in synchronization with the formation of the above toner image. A predetermined transfer bias voltage is applied to the transfer device 24 in timing in which the paper sheet P is conveyed to the nip portion. The toner image on the photosensitive drum 1 is transferred to the paper sheet P by this application of the transfer bias voltage and a pressing action of the paper sheet P against the photosensitive drum 1 using the transfer device 24.

The transferred paper sheet P is then conveyed to a fixing device 25 and the toner image formed on the paper sheet P is fixed to the paper sheet P. The fixed paper sheet P is conveyed in the direction of an arrow W and is discharged to an unillustrated paper discharging tray.

Figure 2:
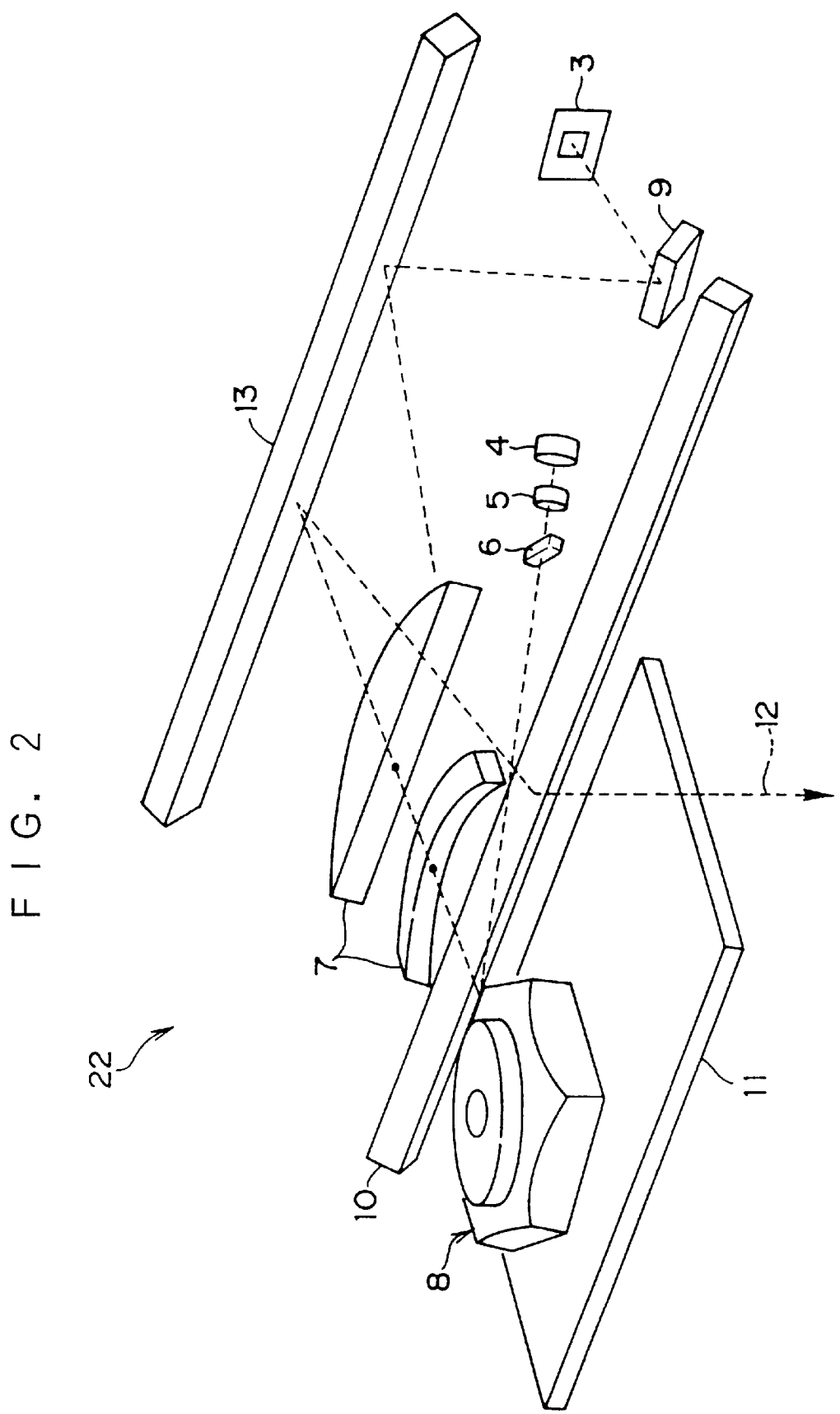
FIG. 2 is a view of the schematic structure of an optical scanner.

The structure of the optical scanner 22 will next be explained by using FIG. 2. As shown in FIG. 2, a laser diode (hereinafter called an LD) 4 is arranged in the optical scanner 22. A collimator lens 5, a cylinder lens 5 and a rotary polygon mirror 8 are sequentially arranged from a side close to the LD 4 on an optical axis of this LD 4. The rotary polygon mirror 8 is arranged on a motor driving substrate 11 constructed by including a motor for operating the rotary polygon mirror 8 and is rotated at an equal angular velocity in a predetermined direction.

An fθ lens 7, a returning mirror 13 and a returning mirror 10 are sequentially arranged from a side close to the rotary polygon mirror 8 on this optical axis. Light reflected on the returning mirror 10 is irradiated to the photosensitive body 1 (see FIG. 1).

Namely, the laser beam irradiated from the LD 4 is incident to the rotary polygon mirror 8 through the collimator lens 5 and the cylinder lens 6 and is deflected by this rotary polygon mirror 8. The laser beam thus deflected by the rotary polygon mirror 8 passes through the fθ lens 7 and is sequentially reflected on the returning mirrors 13 and 10, and is then irradiated to the surface of the photosensitive body 1. At this time, the surface of the photosensitive body 1 is scanned and exposed by the laser beam by the deflection of the laser beam using the rotary polygon mirror 8. An optical path of the laser beam is shown by a broken line 12 in FIG. 2. A main scanning direction is set to a direction in which the photosensitive body 1 is scanned by the laser beam deflected by the rotary polygon mirror 8. A subscanning direction is set to a direction perpendicular to the main scanning direction.

A mirror 9 is disposed in the optical scanner 22 at a predetermined position before an incident position of the laser beam first incident to an image forming area of the photosensitive body 1 when the photosensitive body 1 is scanned by the laser beam. A horizontal synchronous sensor (SOS sensor) 3 is arranged on an optical axis of the laser beam reflected on this mirror 9.

Circuit structure relative to control of LD

Figure 3:
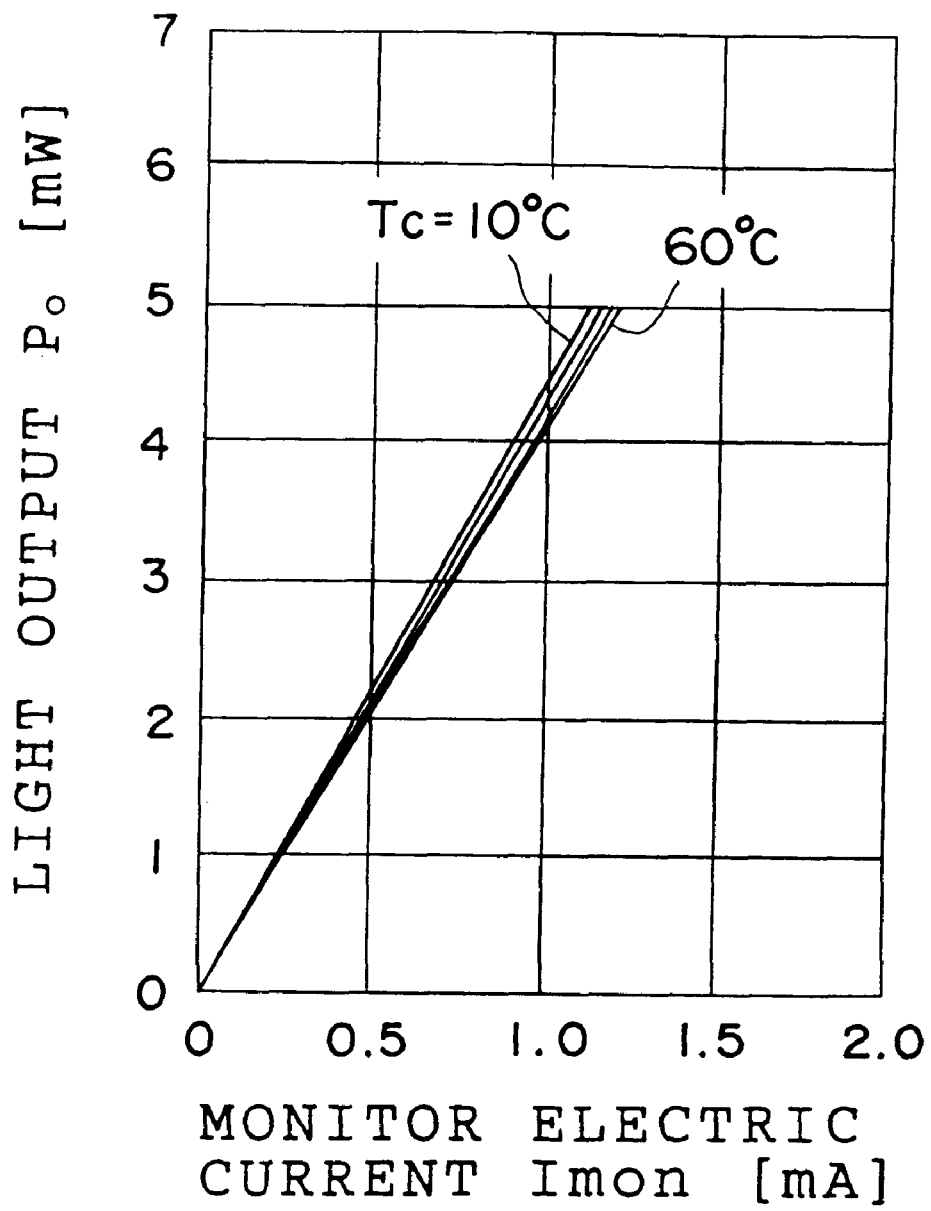
FIG. 3 is a graph showing a light output-monitor electric current characteristic for each temperature.
Figure 7:
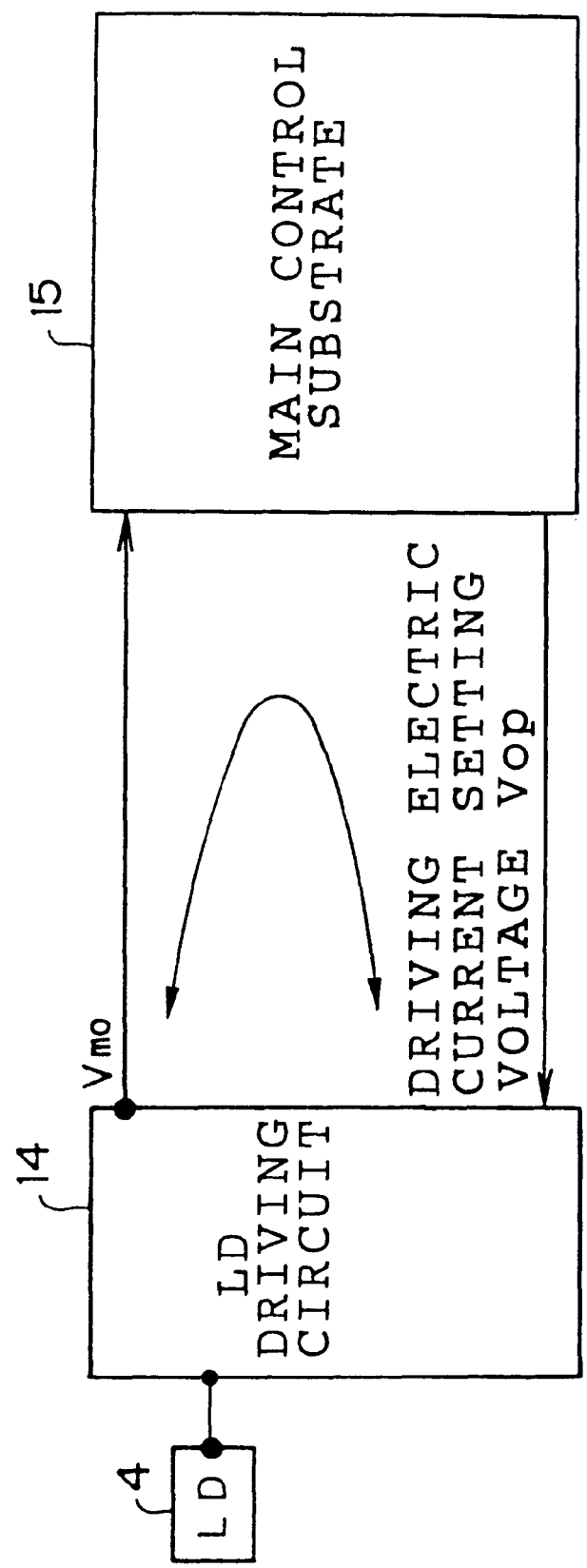
FIG. 7 is a view of the overall structure of a semiconductor laser, a semiconductor laser driving circuit and a control circuit.

The structure of a circuit relating to control of the LD 4 will next be explained by using FIGS. 7 and 8. As shown in FIG. 7, an LD driving circuit 14 for operating the LD 4 is connected to the LD 4. This LD driving circuit 14 is operated by the control of a microcomputer 32 of a main control substrate 15 described later. Concretely, the main control substrate 15 applies a driving electric current setting voltage Vop to the LD driving circuit 14 so that the LD 4 is operated by the LD driving circuit 14. The LD driving circuit 14 has an unillustrated photodiode. Light from the LD 4 is also received by this photodiode. The photodiode outputs a voltage corresponding to a light receiving amount. At this time, the main control substrate 15 monitors a voltage output from the photodiode according to the light output from the LD 4 as a monitor voltage Vmo. FIG. 3 shows the relation of a monitor electric current $I_{mon}$ corresponding to the monitor voltage Vmo and the light output. It should be understood from FIG. 3 that both the monitor electric current $I_{mon}$ and the light output approximately have a proportional relation. Namely, the main control substrate 15 detects the light emitting amount of the LD 4 by detecting the monitor voltage Vmo.

Figure 8:
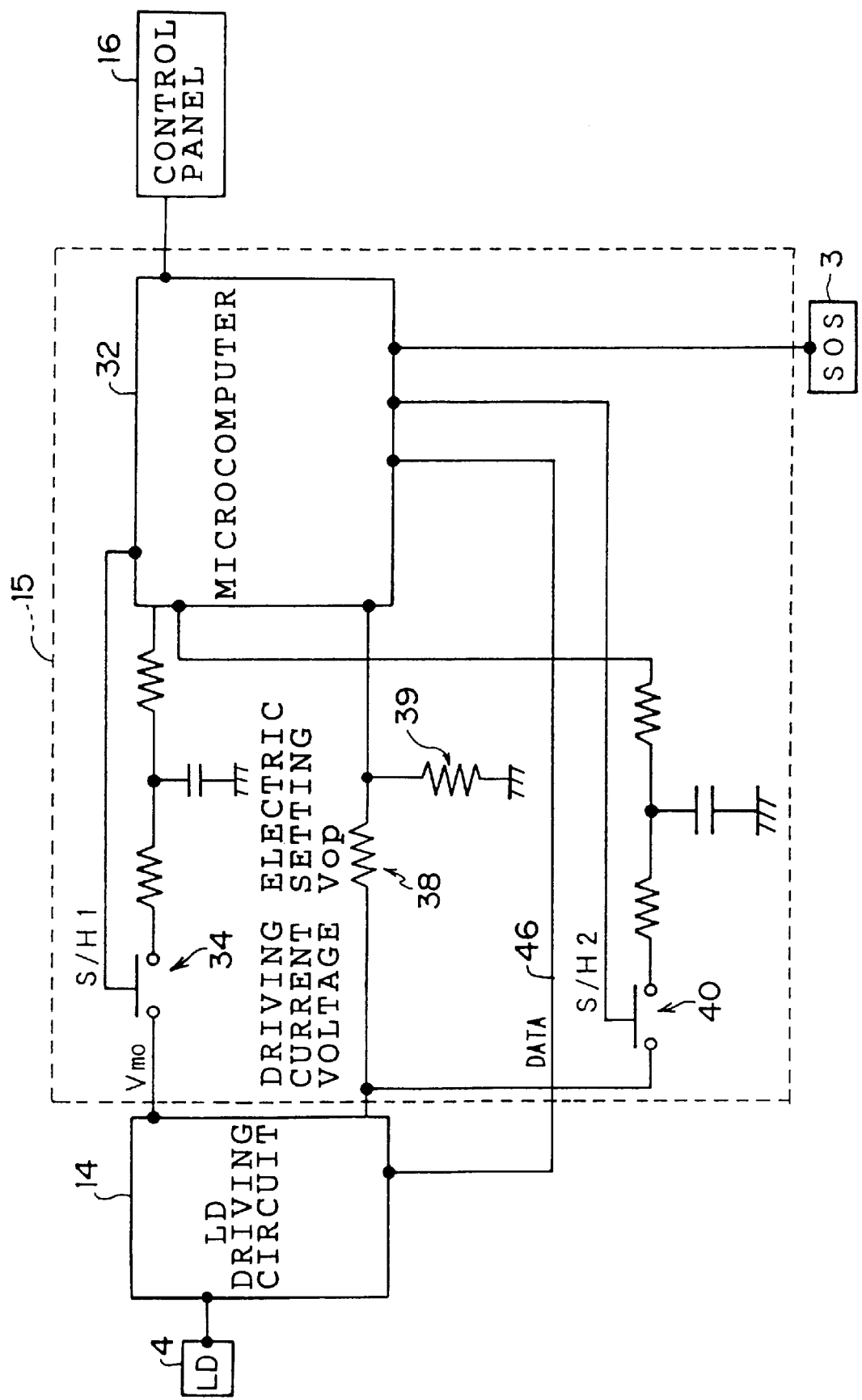
FIG. 8 is a block diagram of each of the semiconductor laser driving circuit and the control circuit.

As shown in FIG. 8, the microcomputer 32 constructed by including unillustrated CPU, ROM, RAM, etc. is arranged in the main control substrate 15. A control panel 16 and the above-mentioned SOS sensor 3 are connected to this microcomputer 32. The control panel 16 is constructed by including an unillustrated display and a key operating portion. The microcomputer 32 receives a signal from the SOS sensor 3 and controls driving timing of the LD 4 on the basis of this signal. The microcomputer 32 also displays a warning message showing deterioration of the LD 4 in the display of the control panel 16 at a detecting time of the deterioration of the LD 4 described later.

The microcomputer 32 applies a driving electric current setting voltage Vop to the LD driving circuit 14 through a circuit constructed by resistors 39 and 38. A sample hold circuit 40 for monitoring the driving electric current setting voltage Vop, a sample hold circuit 34 for monitoring the monitor voltage Vmo according to the light output from the LD 4, and a signal line 46 for transmitting various kinds of control data are arranged between the microcomputer 32 and the LD driving circuit 14.

[Regarding to control by using the LD driving circuit 14 and microcomputer 32]

In the image forming device 30, the monitor voltage Vmo at an obtaining time of a predetermined light amount on the photosensitive body 1 is set to a certain value at a light amount adjusting stage. For example, when the monitor voltage Vmo is 3 V at the obtaining time of a light amount of 0.5 mW on the photosensitive body 1, the driving electric current value of the LD 4 is changed such that the monitor voltage is equal to 3 V. Thus, so-called APC control (Auto Power Control) is executed in the image forming device 30.

Operation of the First Embodiment

A control routine relative to deteriorating detection of the LD 4 in the first embodiment will next be explained in accordance with the flow chart of FIG. 9. In a step 102 of FIG. 9, a driving electric current value If is first measured when the light emitting amount of the LD 4 corresponds to each of three predetermined light amounts P1, P2 and P3. Here, P1<P2<P3 is set.

Concretely, a driving electric current value If1 (mA) is measured when a monitor voltage value Vmo1 (V) providing the light emitting amount of the LD 4 corresponding to a predetermined light amount P1 (mW) is obtained. Similarly, a driving electric current value If2 (mA) is measured when a monitor voltage value Vmo2 (V) corresponding to a predetermined light amount P2 (mW) is obtained. Similarly, a driving electric current value If3 (mA) is measured when a monitor voltage value Vmo3 (V) corresponding to a predetermined light amount P3 (mW) is obtained.

In the next step 104, a differential efficiency $\eta 1$ at an interval from a measuring point A1 to a measuring point A2 is calculated by the following formula (1) from measuring values at three measuring points A1(If1, Vmo1), A2(If2, Vmo2) and A3(If3, Vmo3). A differential efficiency $\eta 2$ at an interval from the measuring point A2 to a measuring point A3 is calculated by the following formula (2) from the measuring values at the three measuring points A1(If1, Vmo1), A2(If2, Vmo2) and A3(If3, Vmo3).

$$\eta 1 = (Vmo2 - Vmo1)/(If2 - If1) \qquad (1)$$

$$\eta 2 = (Vmo3 - Vmo2)/(If3 - If2) \qquad (2)$$

Further, in the next step 106, a ratio value $\alpha$ of the above differential efficiencies is calculated by the following formula (3).

$$\alpha = \eta 2/\eta 1 \qquad (3)$$

Here, a concrete method of processing of each of the steps 104 and 106 will next be explained. First, the driving electric current value is gradually increased so as to obtain the monitor voltage value Vmo1 (V) at which the light emitting amount of the LD 4 corresponds to the predetermined light amount P1 (mW). For example, the driving electric current is APC-controlled such that Vmo1 (V)=1 V is set. The driving electric current value or a driving electric current setting voltage Vop1 corresponding to this driving electric current value at this time is held by the sample hold circuit 40.

Similarly, the driving electric current value is gradually increased so as to obtain the monitor voltage value Vmo2 (V) at which the light emitting amount of the LD 4 corresponds to the predetermined light amount P2 (mW). For example, the driving electric current is APC-controlled such that Vmo2(V)=2 V is set. The driving electric current value or a driving electric current setting voltage Vop2 corresponding to this driving electric current value at this time is held by the sample hold circuit 40.

Similarly, the driving electric current value is gradually increased so as to obtain the monitor voltage value Vmo3 (V) at which the light emitting amount of the LD 4 corresponds to the predetermined light amount P3 (mW). For example, the driving electric current is APC-controlled such that Vmo3 (V)=3 V is set. The driving electric current value or a driving electric current setting voltage Vop3 corresponding to this driving electric current value at this time is held by the sample hold circuit 40.

The microcomputer 32 of FIG. 8 monitors the monitor voltage Vmo according to the light amount from the LD 4 and compares the values of Vref (V) and Vmo (V) with each other such that Vmo is equal to a predetermined value (=Vref). When Vref (V)>Vmo (V), the value of the driving electric current setting voltage Vop (V) is increased. Conversely, when Vref (V)<Vmo (V), the value of the driving electric current setting voltage Vop (V) is decreased. These increasing and decreasing operations are repeated. Thus, the light amount from the LD 4 can be set to a predetermined light amount level.

At this time, when the light amount is set to the predetermined light amount P1 (mW), this light amount can be realized by setting Vref (V)=1 V. When the light amount is set to the predetermined light amount P2 (mW), this light amount can be realized by setting Vref (V)=2 V. When the light amount is set to the predetermined light amount P3 (mW), this light amount can be realized by setting Vref (V)=3 V. When Vref (V)=1 V, Vref (V)=2 V and Vref (V)=3 V are set, the driving electric current setting voltage Vop (V) is held when Vmo (V)=1 V, Vmo (V)=2 V and Vmo (V)=3 V are approximately set. The driving electric current value of the LD can be easily calculated from the circuit structure by a returning formula from the driving electric current setting voltage Vop (V).

The differential efficiency at each of the intervals is calculated by the above formulas (1) and (2) from the driving electric current value thus obtained with respect to each predetermined light amount. Further, a ratio of these differential efficiency values is calculated from the formula (3).

Figure 11:
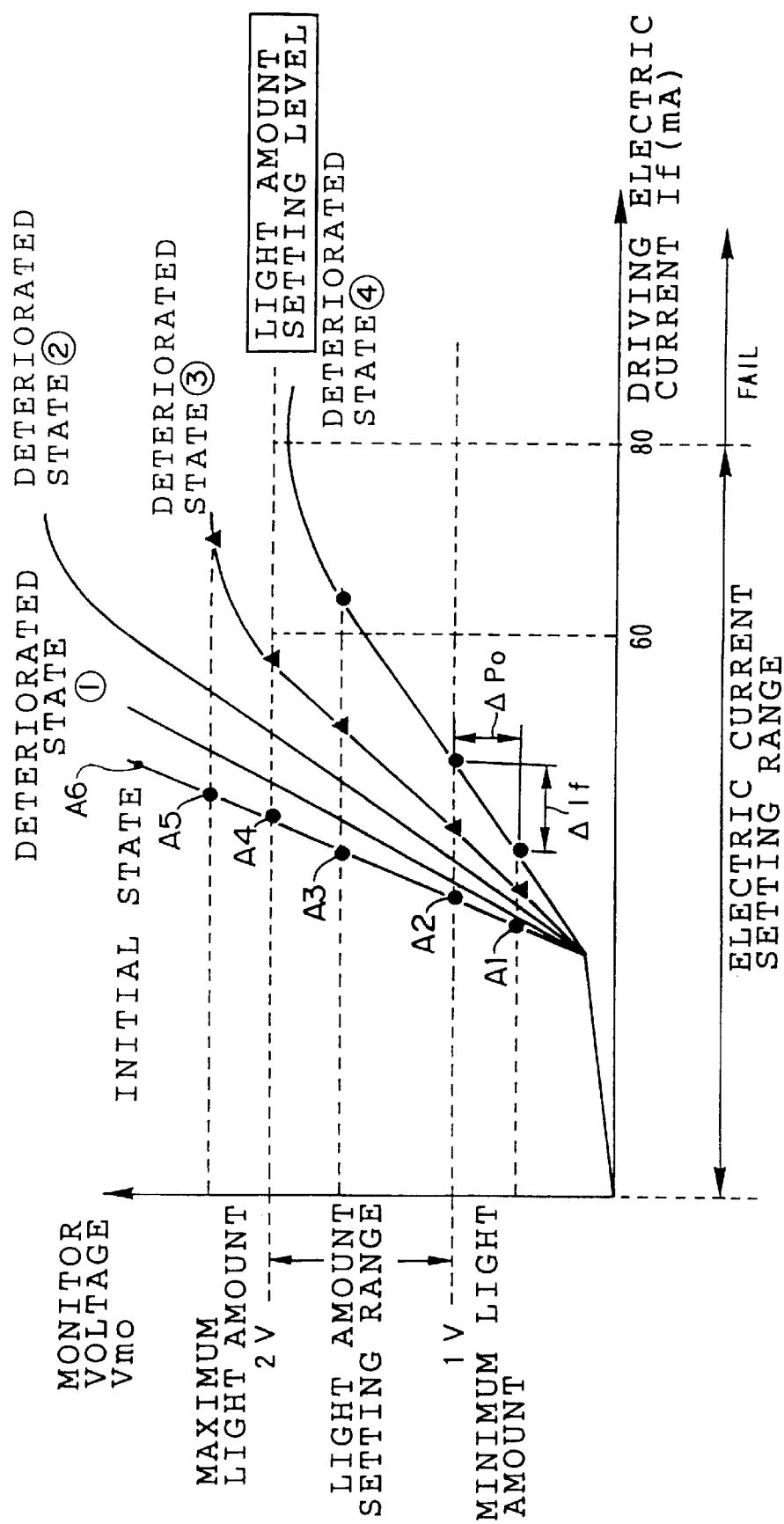
FIG. 11 is a graph for explaining a differential efficiency and a light amount setting level.

When the above differential efficiencies $\eta 1$ and $\eta 2$ are calculated, a light amount range is set to be wider than the range of a light amount level actually used in the image forming device 30. Namely, as shown in FIG. 11, when the light amount range (the actually used light amount range) able to be set by the image forming device 30 ranges from Pmin (mW) to Pmax (mW), the above P1 (mW) is equal to or smaller than Pmin (mW) and the above P3 (mW) is set to be equal to or greater than Pmax (mW). Namely, $$P1(mW) < Pmin(mW) < Pmax(mW) < P3 \ (mW) \qquad (4)$$

is set. The light amount level of P2 (mW) is not particularly restricted.

Figure 9:
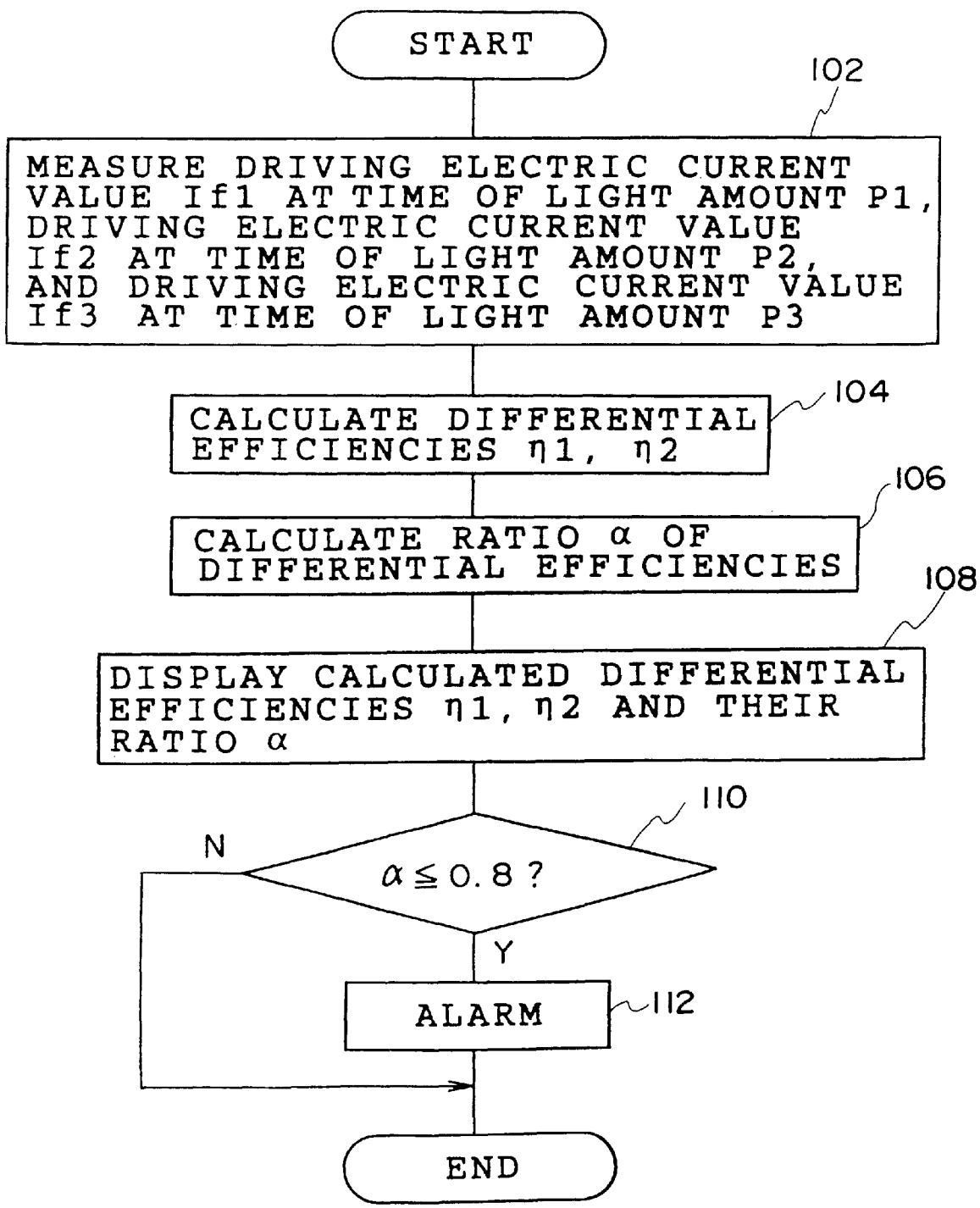
FIG. 9 is a flow chart showing a control routine in a first embodiment.

In the next step 108 in FIG. 9, the differential efficiencies $\eta 1$, $\eta 2$ and their ratio value $\alpha$ calculated above are displayed in a display of the control panel 16. Thus, an operator recognizes the slope of a characteristic curve of the driving electric current value-the light amount value characteristic by the differential efficiencies $\eta 1$, $\eta 2$. The operator also recognizes a bending degree of this characteristic curve by the ratio value a of the above differential efficiencies $\eta 1$, $\eta 2$. Thus, the operator can exactly recognize the deteriorated state of the LD 4.

Further, in the next step 110, it is judged whether or not the ratio a of the differential efficiencies $\eta 1$, $\eta 2$ is equal to or smaller than 0.8.

Figure 4:
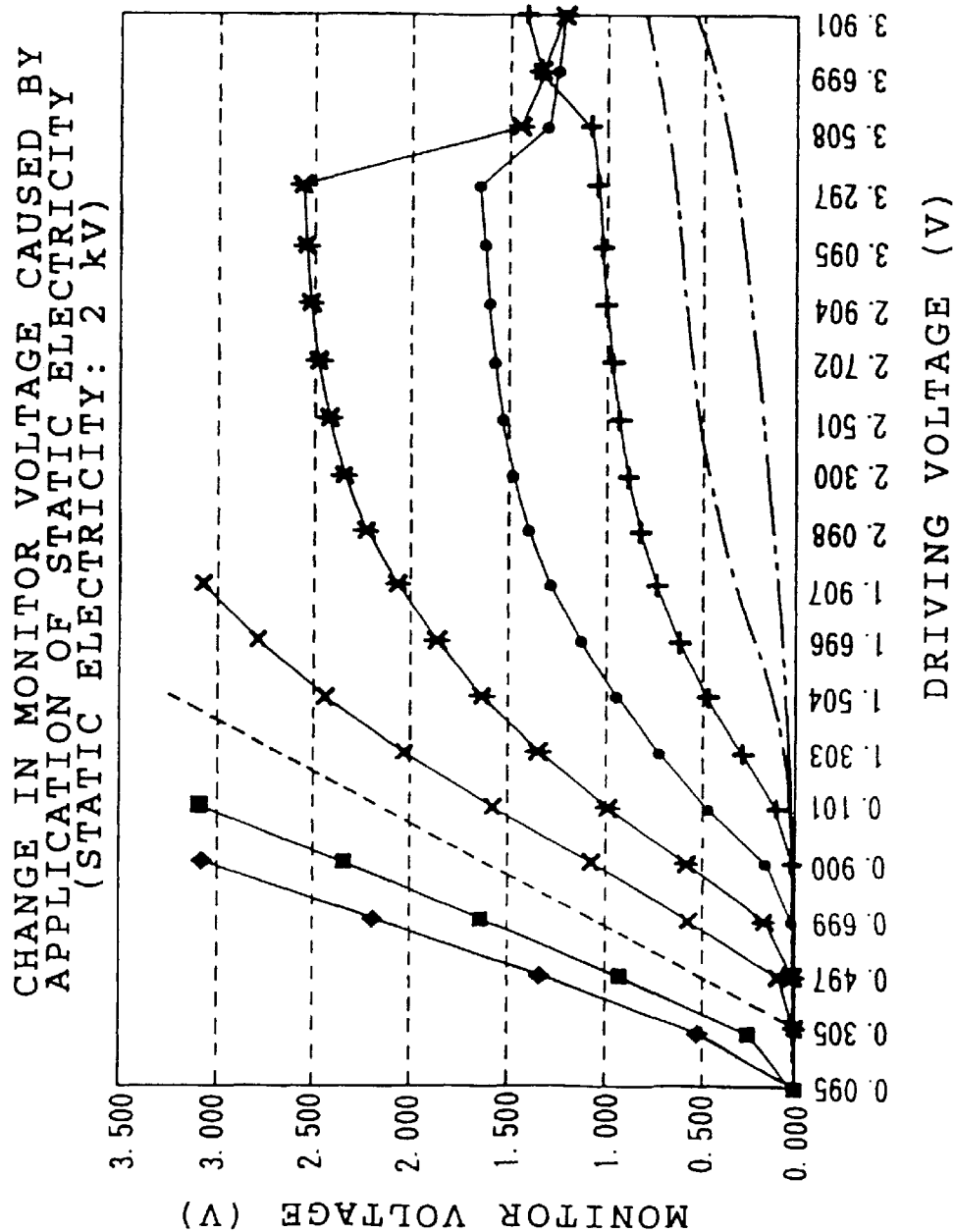
FIG. 4 is a graph showing deterioration of a driving voltage-monitor voltage characteristic due to application of static electricity.
Figure 5:
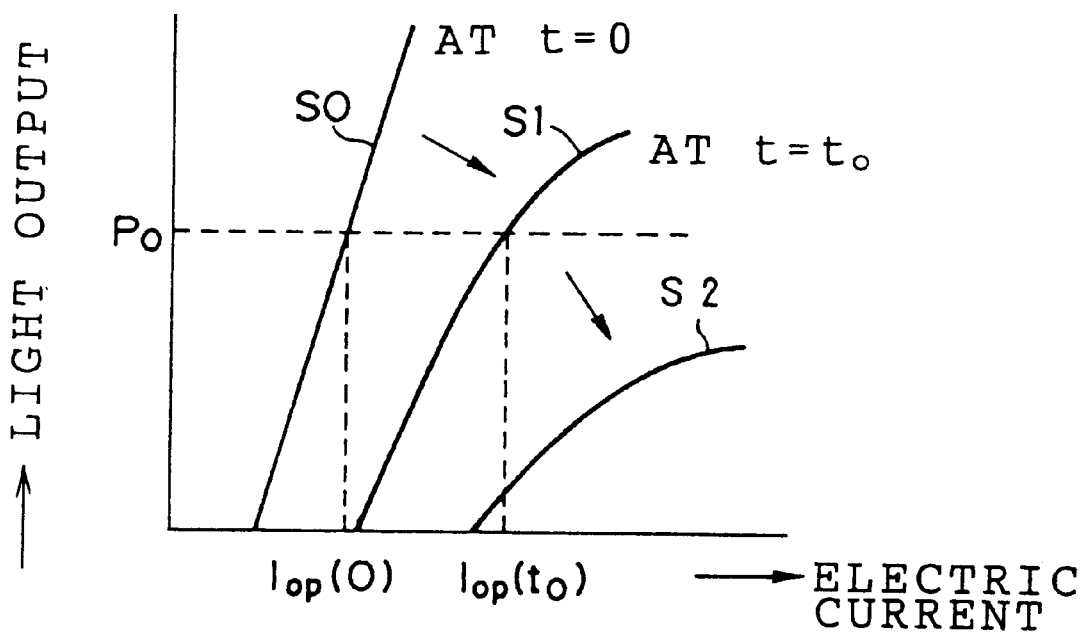
FIG. 5 is a graph showing deterioration over time of a light output-electric current characteristic.
Figure 6:
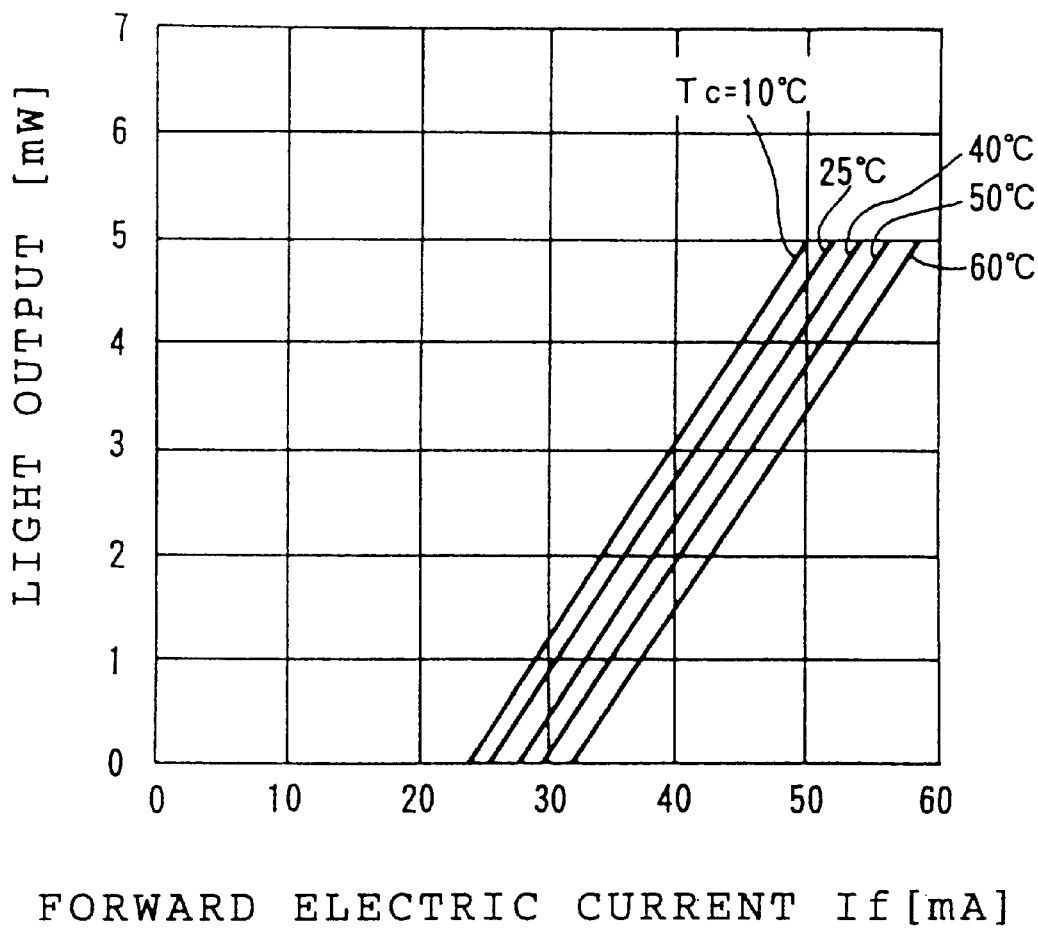
FIG. 6 is a graph showing a light output-forward electric current characteristic for each temperature.

The meaning of the judging reference value "0.8" of the ratio a will be explained here. As can be seen from the graph of FIG. 4, the monitor voltage Vmo approximately shows linear characteristics at least in the actual using area (in a range in which the monitor voltage Vmo ranges from 1 V to 2 V) until a third application of static electricity (+2 kV). In contrast to this, deterioration is extremely rapidly advanced after the third application of the static electricity. Therefore, it can be considered that a time point of this third application is a limit of a range capable of performing the normal operation of the image forming device 30. When the differential efficiency at an interval of the monitor voltage Vmo from 1 V to 2 V is set to $\eta 1$ and the differential efficiency at an interval of the monitor voltage Vmo from 2 V to 2.5 V is set to $\eta 2$ in characteristics in this third application, the ratio $\alpha$ ($=\eta 2/\eta 1$) of these differential efficiencies is equal to about "0.8".

Accordingly, in this embodiment, when the ratio a of the differential efficiencies $\eta 1$, $\eta 2$ is set to be equal to or smaller than 0.8, it is judged that there is a high possibility of stoppage of the functions of the image forming device 30.

If it is judged in the step 110 that the ratio $\alpha$ is equal to or smaller than 0.8, it proceeds to a step 112. In the step 112, the display of the control panel 16 displays a warning message showing that the deterioration of the LD 4 is considerably advanced.

Thus, the considerable advancement of the deterioration of the LD 4 is announced to the operator and can be reliably recognized by the operator.

Further, the state of the LD 4 built in the image forming device 30 is known. Accordingly, for example, it is easily found that a certain surge is applied to the LD 4 in a manufacturing process and the LD 4 is deteriorated so that troubles can be rapidly discriminated from each other. Further, when a customer engineer (CE) or the like carries out maintenance service of the image forming device 30 in a market, the customer engineer can easily distinguish troubles from each other so that the maintenance service time can be shortened. Namely, it is possible to shorten the time over which customers cannot use the image forming device 30.

Further, the operator can recognize that it soon will be time to replace the optical scanner 22 or the like by early detection of the deteriorated state of the LD 4, and can replace the optical scanner 22 or the like. Therefore, it is possible to prevent in advance situations in which the image forming device 30 suddenly stops operating and it takes time to distinguish the faulty portions from each other.

In the above first embodiment, the driving electric current value of the LD 4 at a predetermined light amount setting time is measured and the differential efficiency is calculated. However, the light output at the time of a predetermined driving electric current value may be conversely measured by the monitor voltage and the differential efficiency may be also calculated.

Figure 10:
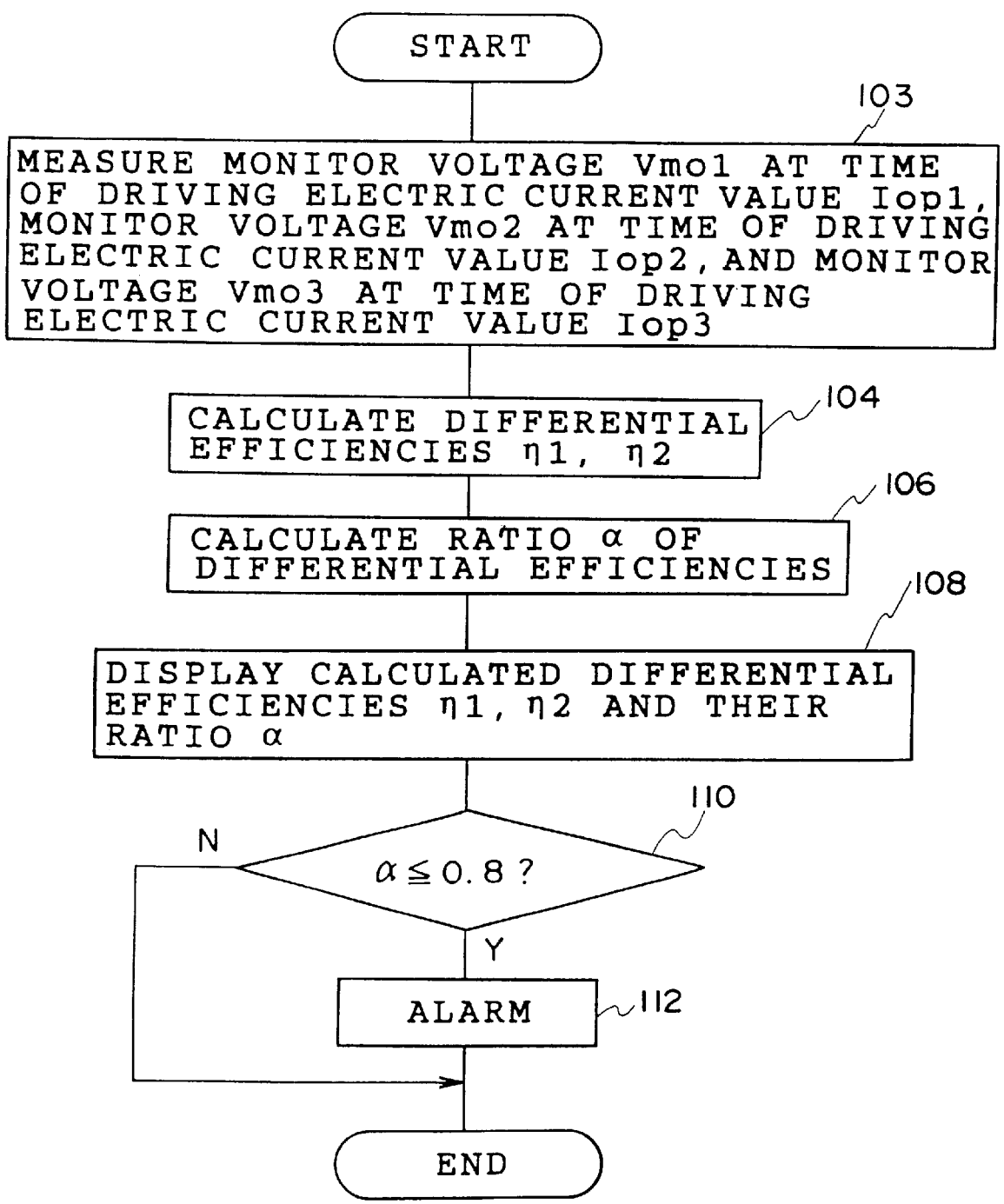
FIG. 10 is a flow chart showing an example of another control routine in the first embodiment.

For example, in a control routine shown in FIG. 10, the values of monitor voltages Vmo1 (V), Vmo2 (V) and Vmo3 (V) are first respectively measured in a step 103 when predetermined driving electric currents Iop1 (mA), Iop2 (mA) and Iop3 (mA) are supplied to the LD 4.

Then, in the next step 104, the differential efficiency may be calculated by using each of the following formulas (5) and (6).

$$\eta1=(Vmo2-Vmo1)/(Iop2-Iop1) \quad (5)$$

$$\eta2=(Vmo3-Vmo2)/(Iop3-Iop2) \quad (6)$$

Processings subsequent to step 106 are similar to those in the first embodiment.

Figure 16:
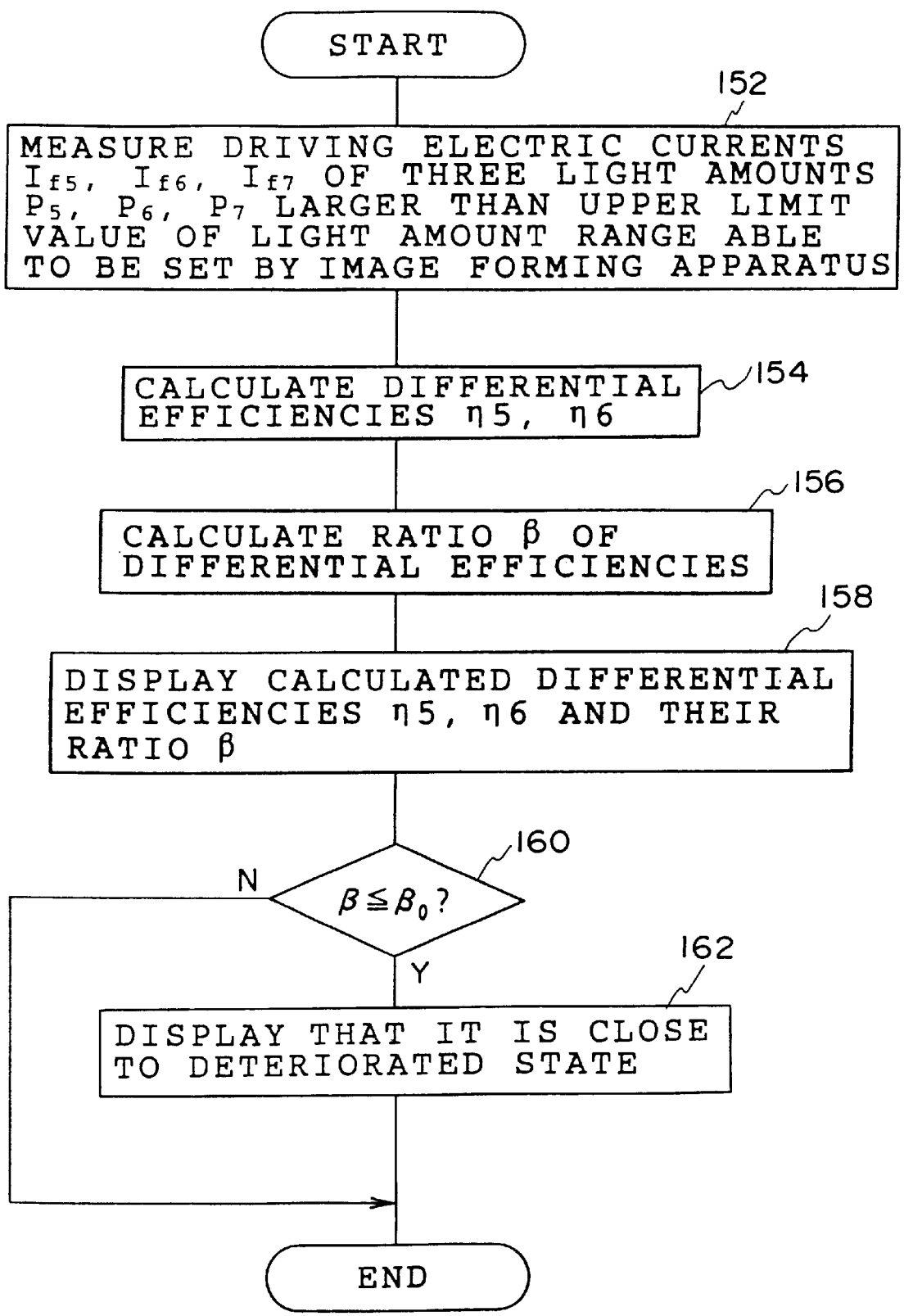
FIG. 16 is a flow chart showing an example of a control routine in a modified example of the first embodiment.

In the first embodiment explained above, the light amount range at a calculating time of the differential efficiency is set to be wider than a light amount level range actually used in the image forming device 30. However, the present invention is not limited to this case. For example, the light amount value at the calculating time of the differential efficiency may be set to at least two values greater than an upper limit value of the light amount level range actually used in the image forming device 30. Namely, as shown in FIG. 16, driving electric current values If5, If6, If7 respectively corresponding to three light amounts P5, P6, P7 (also see FIG. 17) greater than the upper limit value of the light amount level range actually used in the image forming device 30 are measured in a step 152 as mentioned above. Here, P5<P6<P7 is set.

Figure 17:
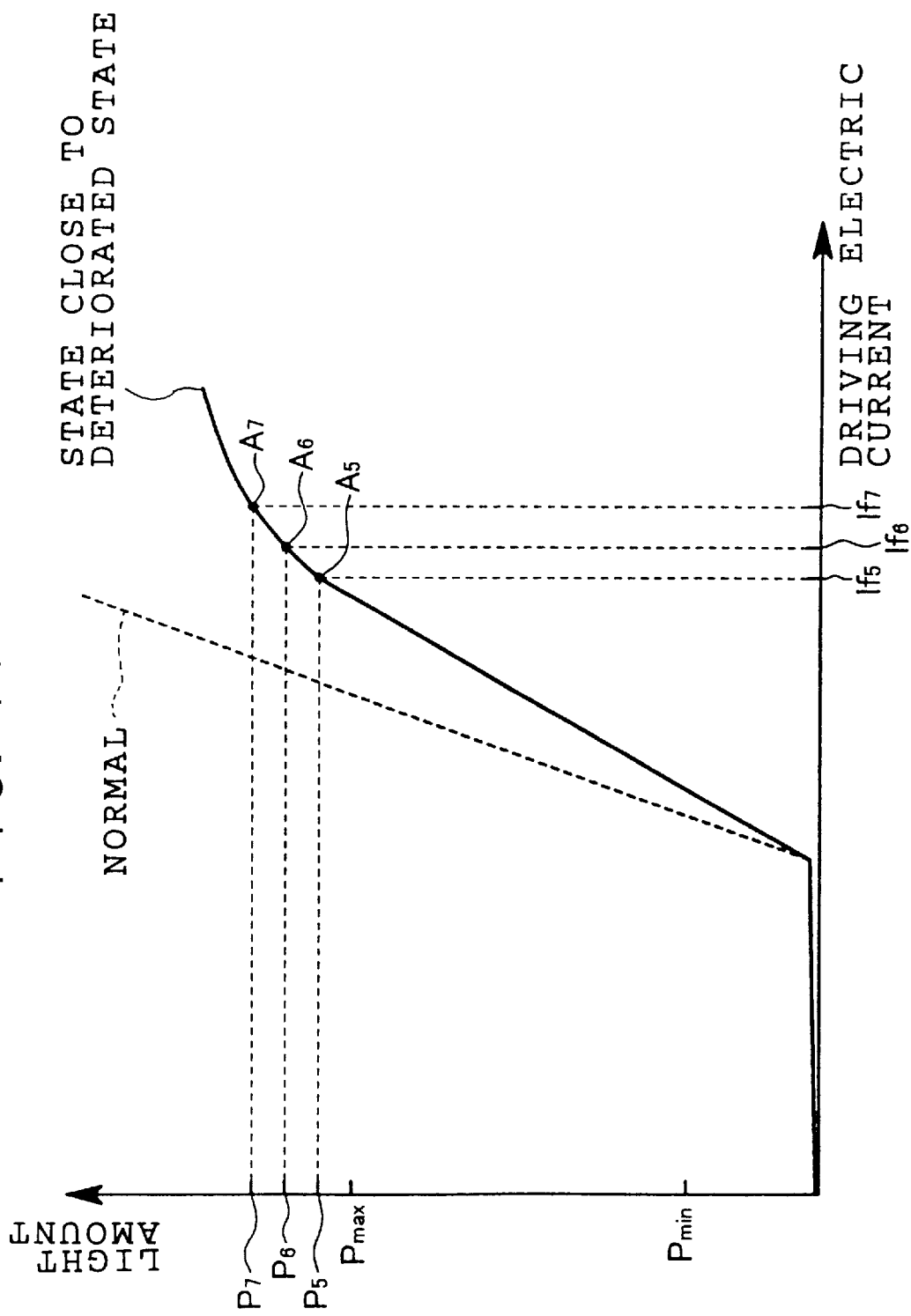
FIG. 17 is an explanatory view for explaining processing using the control routine of FIG. 16.

In the next step 154, as shown in FIG. 17, a differential efficiency η5 at an interval from a measuring point A5 to a measuring point A6, and a differential efficiency η6 at an interval from the measuring point A6 to a measuring point A7 are respectively calculated by the following formulas as mentioned above from values measured at three measuring points A5 (If5, Vmo5), A6(If6, Vmo6), A7(If7, Vmo7).

$$\eta5=(Vmo6-Vmo5)/(If6-If5)$$

$$\eta6=(Vmo7-Vmo6)/(If7-If6)$$

Further, in the next step 156, a ratio value β of the above differential efficiencies is calculated by β=η6/η5.

In the next step 158, the differential efficiencies η5, η6 and their ratio value β calculated above are displayed on the display of the control panel 16. Thus, an operator recognizes the slope of a characteristic curve of the driving electric current value-light amount value characteristic by the differential efficiencies η5, η6. Further, the operator recognizes a bending degree of the characteristic curve by the ratio value β of the above differential efficiencies η5, η6. Thus, the operator can exactly recognize the deteriorated state of the LD 4.

Further, in the next step 160, it is judged whether the ratio β of the differential efficiencies η5, η6 is smaller than a predetermined judging reference value β0. Here, the judging reference value β0 is a value obtained from many experiments and enables judgment as to whether the LD 4 is in a state close to the deteriorated state.

When the ratio β of the differential efficiencies η5, η6 is smaller than the predetermined judging reference value β0, the display of the control panel 16 displays in a step 162 that the LD 4 is in a state close to the deteriorated state.

In the above case, the light output at the time of a predetermined driving electric current value for providing a light amount greater than the upper limit value of the light amount level range actually used in the image forming device 30 may be measured from the monitor voltage and the differential efficiency may be also calculated.

In the above example, when the ratio β of the differential efficiencies η5, η6 is smaller than the predetermined judging reference value β0, the display of the control panel 16 displays that the LD 4 is in a state close to the deteriorated state. However, the present invention is not limited to this case. For example, when at least one of the differential efficiencies η5, η6 is smaller than a judging value which enables judgment as to whether the LD 4 is in a state close to the deteriorated state, the display of the control panel 16 may also display that the LD 4 is in a state close to the deteriorated state.

Second Embodiment

A second embodiment of the present invention will next be explained. Structures relating to control of the image forming device 30 and the LD 4 in this second embodiment are similar to those in the first embodiment, and their explanations are therefore omitted here.

Operation of Second Embodiment

A control routine relating to detection of deterioration of the LD 4 in the second embodiment will next be explained in accordance with the flow chart of FIG. 12. Values of differential efficiencies ηi1, ηi2 in an initial state of the image forming device 30 are set to be stored to a ROM of the microcomputer 32.

Figure 12:
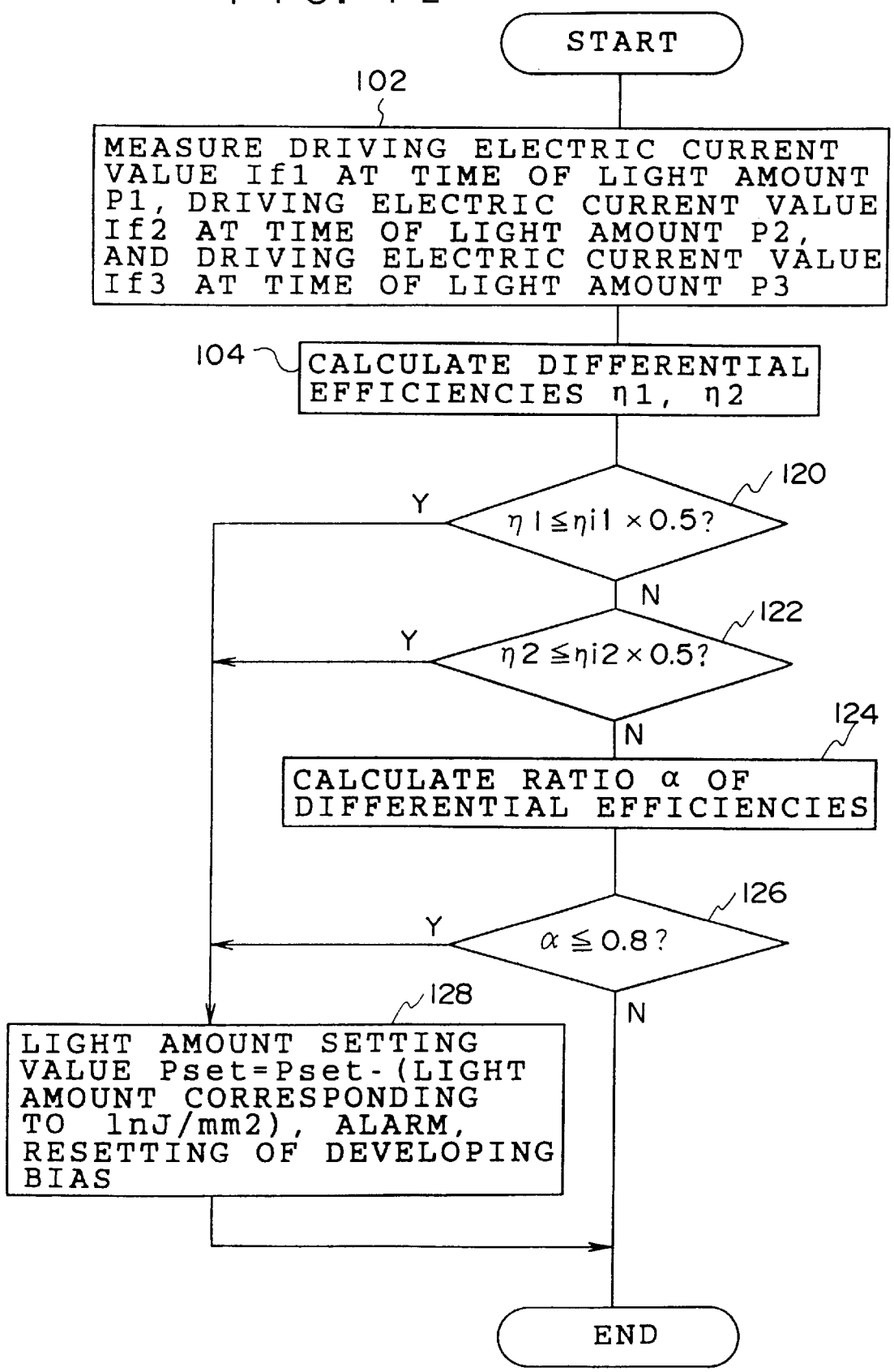
FIG. 12 is a flow chart showing a control routine in a second embodiment.

In a step 102 of FIG. 12, similar to the above-mentioned control routine of FIG. 9, a driving electric current value If is first measured when a light emitting amount of the LD 4 corresponds to each of three predetermined light amounts P1, P2, P3. Here, P1<P2<P3 is set.

Concretely, a driving electric current value If1 (mA) is measured when a monitor voltage value Vmo1 (V) providing the light emitting amount of the LD 4 corresponding to the predetermined light amount P1 (mW) is obtained. Similarly, a driving electric current value If2 (mA) is measured when a monitor voltage value Vmo2 (V) corresponding to the predetermined light amount P2 (mW) is obtained. Similarly, a driving electric current value If3 (mA) is measured when a monitor voltage value Vmo3 (V) corresponding to the predetermined light amount P3 (mW) is obtained.

In the next step 104, a differential efficiency η1 at an interval from a measuring point A1 to a measuring point A2, and a differential efficiency η2 at an interval from the measuring point A2 to a measuring point A3 are respectively calculated by the following formulas (1) and (2) from values measured at three measuring points A1(If1, Vmo1), A2(If2, Vmo2), A3(If3, Vmo3).

$$\eta 1 = (Vmo2-Vmo1)/(If2-If1) \qquad (1)$$

$$\eta 2 = (Vmo3-Vmo2)/(If3-If2) \qquad (2)$$

In the next step 120, it is checked whether the calculated differential efficiency η1 is equal to or smaller than (a differential efficiency ηi1×0.5 in an initial state). If the differential efficiency η1 is equal to or smaller than (the differential efficiency ηi1×0.5 in the initial state), it is considered that a degree of deterioration of the LD 4 is serious and it proceeds to a step 128 described later.

In contrast to this, when the differential efficiency η1 is greater than (the differential efficiency ηi1×0.5 in the initial state), it proceeds to a step 122. In this step 122, it is checked whether or not the calculated differential efficiency η2 is equal to or smaller than (a differential efficiency ηi2×0.5 in the initial state). If the differential efficiency η2 is equal to or smaller than (the differential efficiency ηi2×0.5 in the initial state), it is considered that the degree of deterioration of the LD 4 is serious and it proceeds to the step 128 described later. In contrast to this, when the differential efficiency η2 is greater than (the differential efficiency ηi2×0.5 in the initial state), it proceeds to a step 124. In the step 124, a ratio value a of the above two differential efficiencies is calculated by the following formula (3).

$$\alpha = \eta 2/\eta 1 \qquad (3)$$

In the next step 126, it is checked whether or not the calculated ratio value α is equal to or smaller than 0.8. If the ratio value α is equal to or smaller than 0.8, it is considered that the degree of deterioration of the LD 4 is serious and it proceeds to the step 128 described later.

As mentioned above, when it is considered that the degree of deterioration of the LD 4 is serious (i.e., when each of the differential efficiencies η1, η2 is reduced to a value equal to or smaller than a half of a differential efficiency value in its initial state and when the ratio value a of the two differential efficiencies is reduced to a value equal to or smaller than 0.8), a light amount setting value Pset (mW) on the photosensitive body 1 at the setting stage of an initial light amount such as a rising time of the image forming device 30, etc. is reduced by an amount corresponding to lnJ/mm2 as one example in the step 128. Namely, $$Pset\ (mW) = Pset\ (mW) - (\text{light amount corresponding to lnJ/mm2}) \qquad (7)$$

is set.

In the step 128, a developing bias voltage value of the developing device 23 is reset to prevent the density of an image formed in the image forming device 30 from being reduced in accordance with the change in the light amount setting value Pset (mW). Namely, a developing bias voltage value of the developing device 23 is reset such that the density of an image forming device 30 will be higher than predetermined value. The relation of the developing bias voltage value and the image density in the image forming device 30 is grasped in advance at the stage of a parameter design of the image forming device 30 itself. Accordingly, an optimum value of the developing bias voltage can be easily calculated when setting of the light amount corresponding to lnJ/mm2 is changed as mentioned above.

Further, in the step 128, the display of the control panel 16 displays a warning message showing that the deterioration of the LD 4 is considerably advanced. Thus, the considerable advancement of the deterioration of the LD 4 can be reliably announced to an operator and can be recognized by the operator.

When the light amount setting value Pset (mW) is changed in the step 128, APC control based on the changed light amount setting value Pset (mW) is immediately executed after processing of FIG. 12 is terminated.

In accordance with the second embodiment explained above, the predetermined light amount setting value Pset (mW) is reset to be low when the deterioration of the LD 4 is recognized. Accordingly, it is possible to avoid a situation, such as that of the conventional art, in which the light amount is not increased up to the light amount setting value Pset (mW) even when a maximum driving electric current is supplied to the LD 4. A situation in which the functions of the image forming device 30 stop can also be avoided. Further, early prevention measures can be taken.

Further, since the developing bias voltage is adjusted by resetting the light amount setting value Pset (mW), it is possible to avoid a situation in which the density of an image to be formed is reduced.

In the above second embodiment, the differential efficiency is calculated by measuring the driving electric current value of the LD 4 when a predetermined light amount is provided. However, the differential efficiency may be conversely calculated by measuring the light output at the time of a predetermined driving electric current value from the monitor voltage.

The light amount corresponding to lnJ/mm2 as a width for reducing the light amount setting value Pset (mW) is provided as one example. Accordingly, it is desirable to set a reducing width according to characteristics of each image forming device.

It is not necessary to adjust the developing bias voltage along with the resetting of the light amount setting value Pset (mW). Adjustment of the developing bias voltage is not required if the image density is barely affected by the resetting of the light amount setting value Pset (mW).

Figure 18:
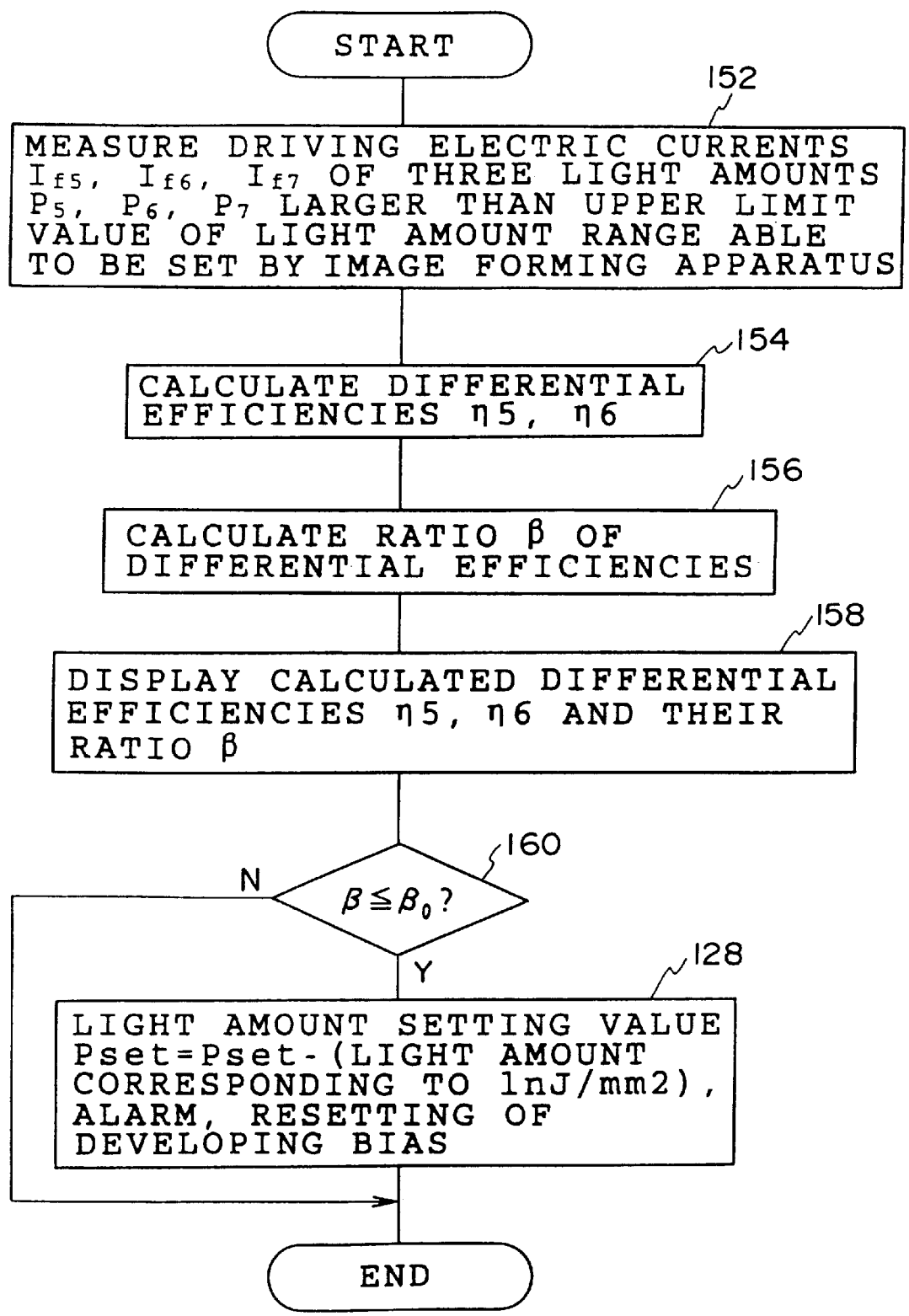
FIG. 18 is a flow chart showing an example of a control routine in a modified example of the second embodiment.

In the second embodiment explained above, the light amount range at the calculating time of the differential efficiency is set to be wider than the light amount level range actually used in the image forming device 30. However, the present invention is not limited to this case. For example, as shown in FIG. 18, the light amount value at the calculating time of the differential efficiency may be set to at least two values greater than an upper limit value of the light amount level range actually used in the image forming device 30. The example shown in FIG. 18 is approximately similar to the example shown in FIG. 16. Accordingly, only different portions will be explained and explanations of the same portions are omitted here. In the example shown in FIG. 18, steps 152 to 158 are executed. When it is judged in a step 160 that a ratio β of differential efficiencies η5, η6 is smaller than a predetermined judging reference value β0, the LD 4 is in a state close to a deteriorated state so that processing of the step 128 is executed at this stage. Namely, the light amount setting value Pset (mW) on the photosensitive body 1 at the setting stage of an initial light amount such as a start-up time of the image forming device 30, etc. is reduced by an amount corresponding to lnJ/mm2 as one example. Further, the developing bias voltage value of the developing device 23 is reset. Further, the display of the control panel 16 displays a warning message showing that the LD 4 is in a state close to the deteriorated to an operator state. Thus, the display can reliably announce the state of the LD 4 close to the deteriorated state, and this state can be recognized by the operator. Further, the life of the image forming device can be further extended since the above light amount setting value Pset (mW) is reduced at a stage at which the LD 4 is in the state close to the deteriorated state. Namely, when the LD 4 is in the state close to the deteriorated state, the life of the image forming device is further extended by reducing the above light amount setting value Pset (mW) at an early time since the time until the deterioration of the LD 4 is shorter than the time from a proper state to a state close to the deteriorated state.

Third Embodiment

A third embodiment of the present invention will next be explained. Structures relating to control of the image forming device 30 and the LD 4 in this third embodiment are similar to those in the first embodiment, and their explanations are therefore omitted here.

Figure 13:
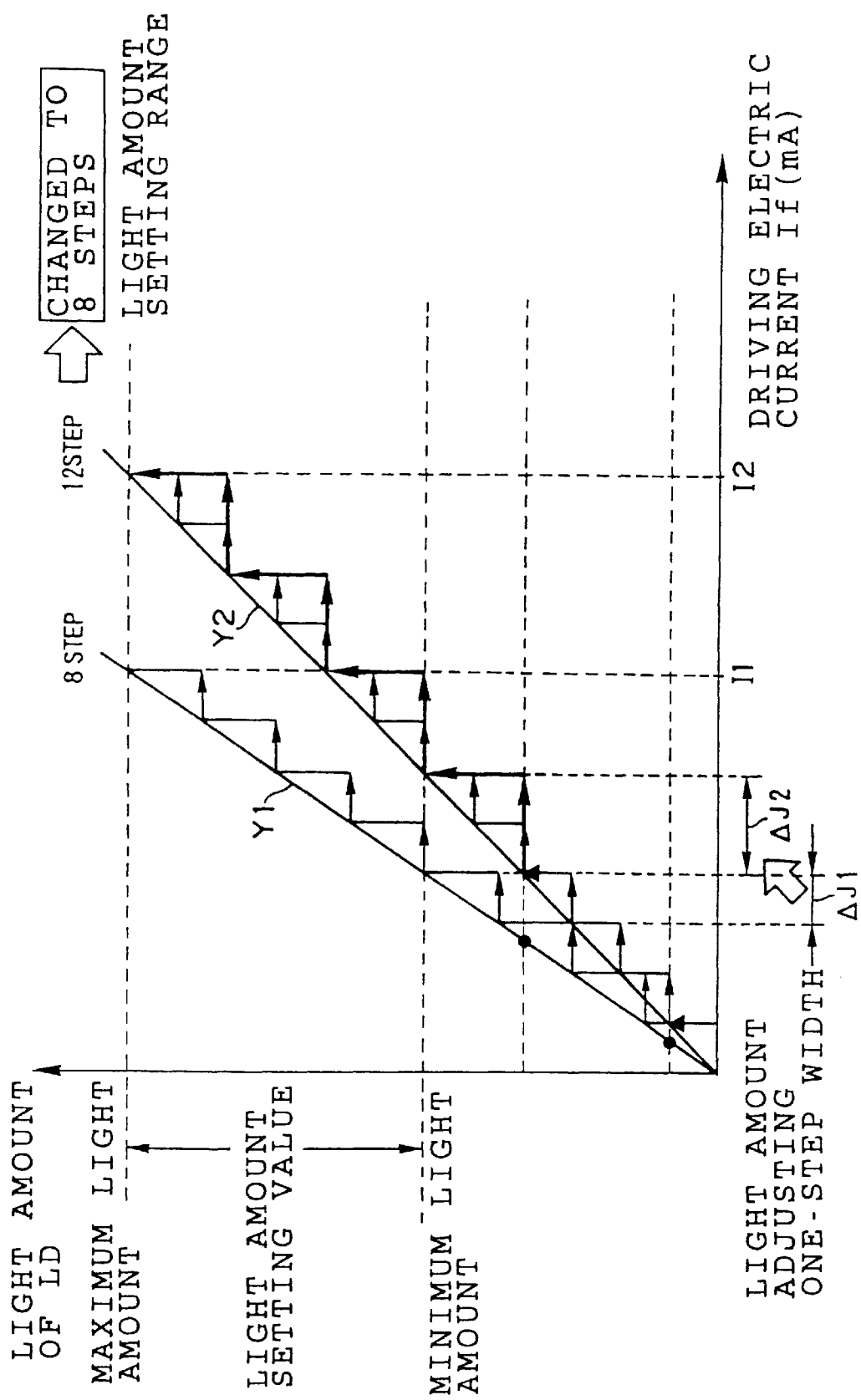
FIG. 13 is a graph for explaining a change in a first step width in APC control.

When deterioration of the LD 4 progresses, the driving electric current value of a semiconductor laser for setting the light amount of the LD 4 to a predetermined light amount is increased at the setting stage of an initial light amount such as a start-up of the image forming device or the like. For example, in the graph of the driving electric current-the light amount characteristic shown in FIG. 13, characteristic Y1 is changed to characteristic Y2 in a short time due to the deterioration of the LD 4. Thus, the driving electric current If for increasing the light amount of the LD 4 until a light amount setting value of FIG. 13 is increased from an electric current I1 to an electric current I2. Accordingly, when the light amount is set by using a predetermined light amount adjusting one-step width $\Delta J1$, 12 steps are required although 8 steps are conventionally required. In this third embodiment, control for solving such disadvantages will be explained.

Operation of the Third Embodiment

A control routine in the third embodiment will next be explained in accordance with the flow chart of FIG. 14. Values of differential efficiencies $\eta i1$, $\eta i2$ in an initial state of the image forming device 30 are stored in a ROM of the microcomputer 32.

Figure 14:
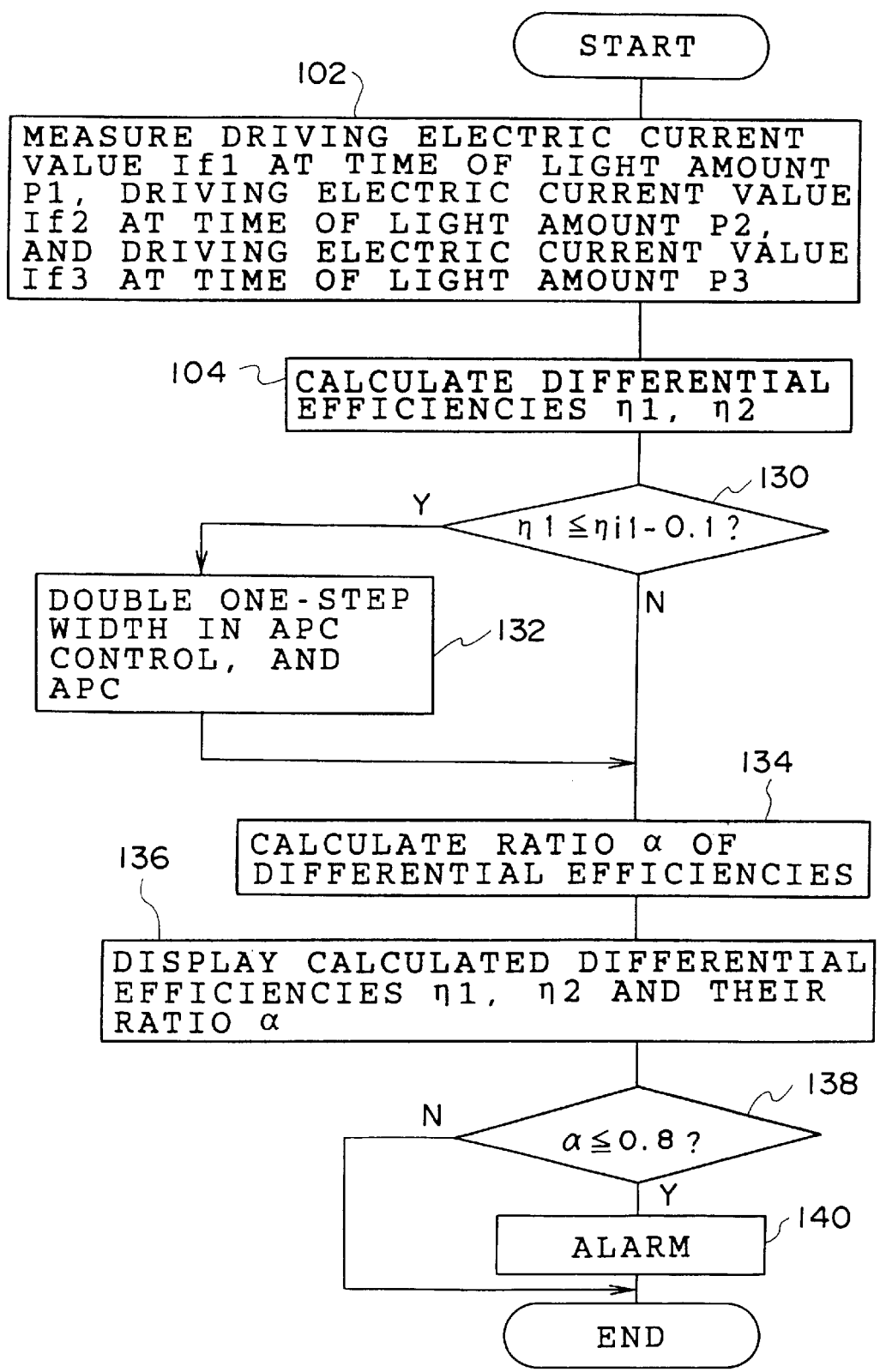
FIG. 14 is a flow chart showing a control routine in a third embodiment.

In a step 102 of FIG. 14, similar to the abovementioned control routine of FIG. 9, a driving electric current value If is first measured when a light emitting amount of the LD 4 corresponds to each of three predetermined light amounts P1, P2, P3. Here, P1<P2<P3 is set.

Concretely, a driving electric current value If1 (mA) is measured when a monitor voltage value Vmo1 (V) providing the light emitting amount of the LD 4 corresponding to the predetermined light amount P1 (mW) is obtained. Similarly, a driving electric current value If2 (mA) is measured when a monitor voltage value Vmo2 (V) corresponding to the predetermined light amount P2 (mW) is obtained. Similarly, a driving electric current value If3 (mA) is measured when a monitor voltage value Vmo3 (V) corresponding to the predetermined light amount P3 (mW) is obtained.

In the next step 104, a differential efficiency $\eta i1$ at an interval from a measuring point A1 to a measuring point A2, and a differential efficiency $\eta 2$ at an interval from the measuring point A2 to a measuring point A3 are respectively calculated by the following formulas (1) and (2) from values measured at three measuring points A1(If1, Vmo1), A2(If2, Vmo2) and A3(If3, Vmo3).

$$\eta 1=(Vmo2-Vmo1)/(If2-If1) \tag{1}$$

$$\eta 2=(Vmo3-Vmo2)/(If3-If2) \tag{2}$$

In the next step 130, it is checked whether the differential efficiency $\eta 1$ at a lowest calculated light amount level is equal to or smaller than (a differential efficiency $\eta i1$ in its initial state−0.1). If the differential efficiency $\eta 1$ is equal to or smaller than (the differential efficiency $\eta i1$ in the initial state−0.1), it is considered that the degree of deterioration of the LD 4 is serious, and the routine proceeds to a step 132.

In the step 132, the driving electric current value (=one step width) changed in one step in the APC control is set to be two times the driving electric current value used until now and the APC control is performed. For example, in a state of driving electric current-light amount characteristic Y2 shown in FIG. 13, the light amount adjusting one-step width is reset from $\Delta J1$ to $\Delta J2$ (=$\Delta J1\times 2$) from a fifth step. Thus, as shown by a thick line in FIG. 13, the light amount is adjusted after the fifth step, and the light amount adjustment is completed in 8 steps although 12 steps were originally required.

Thus, it is possible to avoid lengthening of a light amount control time caused by the deterioration of the LD 4.

Subsequent steps (steps 134 to 140 in FIG. 14) are similar to steps 106 to 112 of FIG. 9 in the first embodiment.

In the above step 132, the driving electric current value (=one step width) changed in one step in the APC control is set to be two times the driving electric current value used until now, and the light amount is adjusted. However, the present invention is not limited to this case. For example, as shown in FIG. 19, the driving electric current value (=one step width) changed in one step in the APC control may be set (coarsely adjusted) to be two times the driving electric current value used until now in a step 164 instead of the step 132, and power may be incremented (the driving electric current is increased) in a step 165. The light output is set to a target value in a light amount setting range, e.g., a value close to an upper limit value, e.g., 80% of the upper limit value by this power increment. As a result, an affirmative judgment is made in a step 166. In a step 168, the light amount is adjusted (in a fine adjustment) such that the driving electric current value (=one step width) changed in one step in the APC control is set to be half the driving electric current value used until now. Thus, the light output may be set to the target value by such adjustments.

An amount of the driving electric current supplied after this can be calculated from the value of the differential efficiency $\eta$ to increase the light amount of the LD 4 until a predetermined light amount setting value at the setting stage of an initial light amount.

Figure 15:
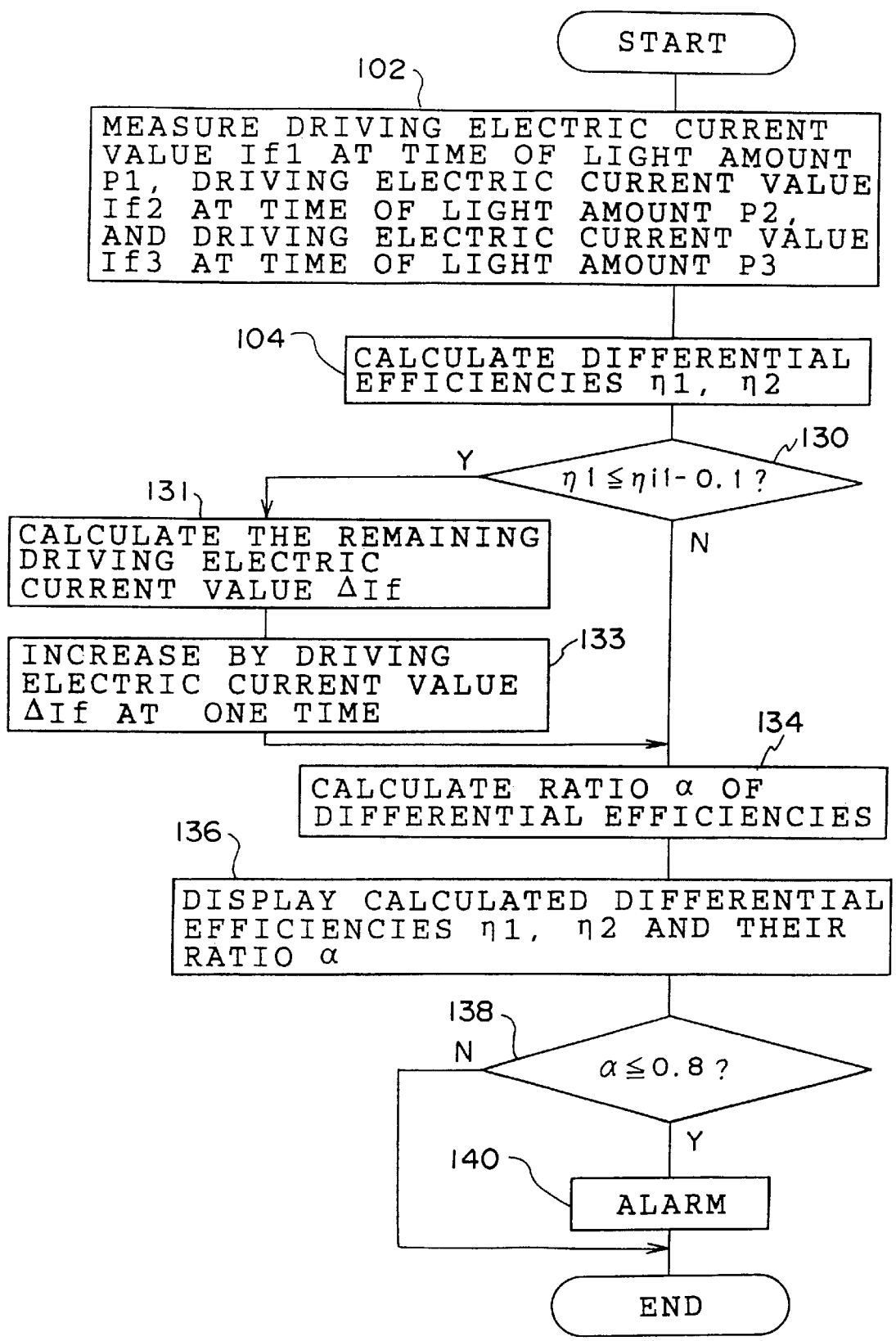
FIG. 15 is a flow chart showing an example of another control routine in the third embodiment.

Therefore, a control routine of FIG. 15 may be executed instead of the control routine of FIG. 14. Namely, if the differential efficiency $\eta 1$ is equal to or smaller than (the differential efficiency $\eta i1$ in the initial state−0.1) in a step 130 of FIG. 15, it is considered that the degree of deterioration of the LD 4 is serious. In a step 131, the remaining driving electric current value $\Delta If$ is calculated by the following formula (8) until the light output of the LD 4 reaches an upper limit value of a light amount setting range for image forming processing.

$$\Delta If\ (mA)=(Vset-Vmo2)/\eta 1 \tag{8}$$

Here, the monitor voltage of the LD corresponding to the predetermined light amount level Pset (mW) is set to Vset (V).

The present invention is not limited to this case. For example, a driving electric current value for setting the light output of the LD 4 to the upper limit value of the light amount setting range for the image forming processing may be stored in accordance with the differential efficiency, and the driving electric current corresponding to the calculated differential efficiency may be retrieved and provided.

Further, in the next step 133, the driving electric current value is increased by the above calculated driving electric current value ΔIf at one time.

The light amount control time can be shortened by executing such control irrespective of the deteriorated state of the LD.

In the above example shown in FIG. 19, the coarse adjustment may be made by supplying the driving electric current provided by retrieval as mentioned above instead of the step 164.

In the above third embodiment, the differential efficiency is calculated by measuring the driving electric current value of the LD 4 at the setting time of a predetermined light amount. However, the differential efficiency may be conversely calculated by measuring the light output at the time of a predetermined driving electric current value from the monitor voltage.

The deterioration of the LD 4 is also judged when the differential efficiency η1 is reduced to a value equal to or smaller than (the differential efficiency ηi1 in the initial state−0.1). However, the above value "0.1" is provided as one example. Accordingly, it is desirable to set a constant at a judging time in accordance with characteristics of each image forming device.

Further, in the above third embodiment, when the differential efficiency η1 is changed by a predetermined value or more from its initial value after the differential efficiencies η1, η2 are calculated, one step width in the APC control is doubled (see step 132 in FIG. 14) and the driving electric current is increased by the remaining driving electric current value ΔIf at one time (see steps 131, 133 in FIG. 15), and the coarse and fine adjustments are made (see steps 164 to 168 in FIG. 19). However, the present invention is not limited to these cases. At a stage providing the differential efficiency η1, one step width in the APC control may be doubled (FIG. 14) and the driving electric current may be increased by the remaining driving electric current value ΔIf at one time (FIG. 15), and the coarse and fine adjustments may be made (FIG. 19). Thus, a time for increasing the light output until a target value can be shortened.

The case of three measuring points is explained in the above first to third embodiments. However, the driving electric current, etc. may be measured by arranging four measuring points or more. The differential efficiency ratio is calculated on the basis of adjacent differential efficiencies. However, the present invention is not limited to this case. For example, the differential efficiency ratio may be calculated on the basis of separated differential efficiencies.

Namely, the differential efficiency ratio may be calculated by calculating a ratio of one differential efficiency to a differential efficiency other than a differential efficiency adjacent to this one differential efficiency. Namely, for example, when an initial state in FIG. 11 is explained as an example, in a case in which one differential efficiency is calculated from detecting points A1 and A2, the differential efficiency ratio may be calculated from a ratio of this one differential efficiency and a differential efficiency other than a differential efficiency (a differential efficiency calculated from detecting points A2, A3) adjacent to this one differential efficiency, e.g., a differential efficiency calculated from detecting points A3, A4, a differential efficiency calculated from detecting points A4, A5, a differential efficiency calculated from detecting points A5, A6, or the like.

Thus, the above differential efficiency ratio is calculated by determining a ratio of one differential efficiency to a differential efficiency other than a differential efficiency adjacent to this one differential efficiency. Accordingly, the deteriorated situation of the LD 4 can be more clearly calculated. In particular, the further apart the one differential efficiency and the differential efficiency other than a differential efficiency adjacent to the one differential efficiency, the more clearly the deteriorated state of the LD 4 can be calculated. Namely, as the deteriorated state progresses from deteriorated state to deteriorated state to deteriorated state, the deteriorated state of the LD 4 can be more clearly determined by the ratio of the differential efficiency determined from points corresponding to the detecting points A1, A2 and the differential efficiency determined from points corresponding to the detecting points A4, A5, or the like, than by the ratio of the differential efficiency determined from points corresponding to the detecting points A1, A2 (i.e., points at which the driving electric current or the light output corresponds to the detecting points A1, A2) and the differential efficiency determined from points corresponding to the detecting points A3, A4. Namely, it is desirable that one differential efficiency is determined from a driving electric current and a light output on a small value side, and a differential efficiency, other than a differential efficiency adjacent to this one differential efficiency, is calculated from a driving electric current and a light output on a large value side.

For example, when a ratio of the differential efficiency calculated from points corresponding to the detecting points A1, A2 and a differential efficiency other than a differential efficiency adjacent to this calculated differential efficiency is calculated, the ratio of the differential efficiency calculated from the points corresponding to the detecting points A1, A2 and a differential efficiency calculated from the driving electric current and the light amount value (light output) at the detecting point A1 and the driving electric current and the light amount value (light output) at a point corresponding to one of detecting points A2, A3, A4, . . . may be calculated. Or, a ratio of the differential efficiency calculated from the points corresponding to the detecting points A1, A2 and a differential efficiency calculated from the driving electric current and the light amount value (light output) at a point corresponding to the detecting point A2 and the driving electric current and the light amount value (light output) at a point corresponding to one of detecting points A4, A5, A6, . . . may be calculated.

What is claimed is:

1. An image forming device comprising:

an optical scanner which has a laser beam emitting portion for emitting a laser beam in accordance with a predetermined driving electric current by the driving electric current being supplied to the laser beam emitting portion, and which forms an electrostatic latent image on an image carrier by deflecting and scanning the light emitted from said laser beam emitting portion;

a light amount detector for detecting a light amount emitted from said laser beam emitting portion;

a calculator, and when a plurality of driving electric currents having respectively different magnitudes are supplied to the laser beam emitting portion, said calculator, on the basis of a plurality of light amount values which have respectively different magnitudes and which are detected by said light amount detector, calculates a differential efficiency expressed by a ratio of one difference between a driving electric current and a light amount value to another difference, or calculates a ratio of differential efficiencies; and an announcing device for announcing a value of the differential efficiency or a value of the ratio of the differential efficiencies calculated by said calculator.

2. An image forming device according to claim 1, wherein when driving currents of different magnitudes are supplied to the laser beam emitting portion, an upper limit value of a range of the light amount values detected by said light amount detector is set to be greater than an upper limit value of a range of light amount values set for image forming processing at said image forming device.

3. An image forming device according to claim 2, wherein at least two light amount values greater than the upper limit value of the range of the light amount values set for the image forming processing at said image forming device are included in the plurality of light amount values which have respectively different magnitudes and which are detected by said light amount detector.

4. An image forming device according to claim 3, wherein said announcing device further announces that said laser beam emitting portion is close to a deteriorated state when the differential efficiency or the ratio of differential efficiencies calculated by said calculator on the basis of at least two light amount values greater than the upper limit value of the range of the light amount values set for the image forming processing is smaller than a predetermined value.

5. An image forming device according to claim 1, wherein said announcing device further announces that said laser beam emitting portion has deteriorated when the value of the differential efficiency has changed by a predetermined value or more from its initial value, or when the value of the ratio of differential efficiencies has changed by a predetermined value or more from its initial value.

6. An image forming device according to claim 1, wherein said calculator calculates the ratio of differential efficiencies by calculating a ratio of one differential efficiency to a differential efficiency other than a differential efficiency adjacent to said one differential efficiency.

7. An image forming device comprising:
an optical scanner which has a laser beam emitting portion for emitting a laser beam in accordance with a predetermined driving electric current by the driving electric current being supplied to the laser beam emitting portion, and which forms an electrostatic latent image on an image carrier by deflecting and scanning the light emitted from said laser beam emitting portion;
a light amount detector for detecting a light amount emitted from said laser beam emitting portion;
a calculator, and when a plurality of driving electric currents having respectively different magnitudes are supplied to the laser beam emitting portion, said calculator, on the basis of a plurality of light amount values which have respectively different magnitudes and which are detected by said light amount detector, calculates a differential efficiency expressed by a ratio of one difference between a driving electric current and a light amount value to another difference, or calculates a ratio of differential efficiencies; and
light amount reference value setting means for resetting a light amount reference value predetermined at a time of initial light amount adjustment of said laser beam emitting portion to be low when the value of the differential efficiency calculated by said calculator has changed by a predetermined value or more from its initial value, or when the value of the ratio of differential efficiencies calculated by said calculator has changed by a predetermined value or more from its initial value.

8. An image forming device according to claim 7, further comprising developing bias adjusting means for adjusting a developing bias voltage of a developing device of said image forming device such that a density of an image to be formed does not decrease when the light amount reference value is reset to be low by said light amount reference value setting means.

9. An image forming device according to claim 7, wherein when driving electric currents of different magnitudes are supplied to the laser beam emitting portion, an upper limit value of a range of light amount values detected by said light amount detector is set to be greater than an upper limit value of a range of light amount values set for image forming processing at said image forming device.

10. An image forming device according to claim 9, wherein at least two light amount values greater than the upper limit value of the range of the light amount values set for the image forming processing at said image forming device are included in the plurality of light amount values which have respectively different magnitudes and which are detected by said light amount detector.

11. An image forming device according to claim 10, wherein said announcing device further announces that said laser beam emitting portion is close to a deteriorated state when the differential efficiency or the ratio of differential efficiencies calculated by said calculator on the basis of at least two light amount values greater than the upper limit value of the range of the light amount values set for the image forming processing is smaller than a predetermined value.

12. An image forming device according to claim 7, wherein said announcing device further announces that said laser beam emitting portion has deteriorated when the value of the differential efficiency has changed by a predetermined value or more from its initial value, or when the value of the ratio of differential efficiencies has changed by a predetermined value or more from its initial value.

13. An image forming device comprising:
an optical scanner which has a laser beam emitting portion for emitting a laser beam in accordance with a predetermined driving electric current by the driving electric current being supplied to the laser beam emitting portion, and which forms an electrostatic latent image on an image carrier by deflecting and scanning the light emitted from said laser beam emitting portion;
a light amount detector for detecting a light amount emitted from said laser beam emitting portion;
a calculator, and when a plurality of driving electric currents having respectively different magnitudes are supplied to the laser beam emitting portion, said calculator, on the basis of at least two light amount values which are detected by said light amount detector and which are greater than an upper limit value of a range of light amount values set for image forming processing, calculates differential efficiency expressed by a ratio of one difference between a driving electric current and a light amount value to another difference, or calculates a ratio of differential efficiencies; and
light amount reference value setting means for resetting a light amount reference value predetermined at a time of initial light amount adjustment of said laser beam emitting portion to be low when the differential efficiency calculated by said calculator is smaller than a predetermined value, or the ratio of differential efficiencies is smaller than a predetermined value.

14. An image forming device according to claim 13, further comprising developing bias adjusting means for adjusting a developing bias voltage of a developing device of said image forming device such that a density of an image to be formed does not decrease when the light amount reference value is reset to be low by said light amount reference value setting means.

15. An image forming device according to claim 13, wherein said announcing device further announces that the laser beam emitting portion is close to a deteriorated state when the differential efficiency calculated by said calculator is smaller than a predetermined value or the ratio of differential efficiencies is smaller than a predetermined value.

16. An image forming device comprising:

an optical scanner which has a laser beam emitting portion for emitting a laser beam in accordance with a predetermined driving electric current by the driving electric current being supplied to the laser beam emitting portion, and which forms an electrostatic latent image on an image carrier by deflecting and scanning the light emitted from said laser beam emitting portion;

a light amount detector for detecting a light amount emitted from said laser beam emitting portion;

a calculator, and when a plurality of driving electric currents having respectively different magnitudes are supplied to the laser beam emitting portion, said calculator, on the basis of a plurality of light amount values which have respectively different magnitudes and which are detected by said light amount detector, calculates a differential efficiency expressed by a ratio of one difference between a driving electric current and a light amount value to another difference, or calculates a ratio of differential efficiencies; and light amount adjusting means for adjusting an initial light amount of the laser beam emitting portion by increasing a predetermined unit light amount adjusting width when the value of the differential efficiency calculated by said calculator has changed by a predetermined value or more from its initial value, or when the value of the ratio of differential efficiencies calculated by said calculator has changed by a predetermined value or more from its initial value.

17. An image forming device according to claim 16, wherein when driving electric currents of different magnitudes are supplied to the laser beam emitting portion, a lower limit value of a range of the light amount values detected by said light amount detector is set to be smaller than a lower limit value of a range of light amount values set for image forming processing at said image forming device.

18. An image forming device according to claim 16, wherein said light amount adjusting means coarsely adjusts an initial light amount of the laser beam emitting portion at the increased unit light amount adjusting width until the light amount of the laser beam emitting portion is close to an upper limit value of a range of light amount values set for image forming processing at said image forming device, and when the light amount of the laser beam emitting portion is close to the upper limit value, said light amount adjusting means finely adjusts the initial light amount of the laser beam emitting portion at a unit light amount adjusting width smaller than the increased unit light amount adjusting width.

19. An image forming device according to claim 18, wherein said light amount adjusting means effects said coarse adjustment on the basis of the value of the differential efficiency or the value of the ratio of differential efficiencies by supplying a predetermined driving electric current to the laser beam emitting portion in accordance with the value of the differential efficiency or the value of the ratio of differential efficiencies for setting the light amount emitted from the laser beam emitting portion to the upper limit value of the range of light amount values set for image forming processing at said image forming device.

20. An image forming device according to claim 19, wherein the value of the differential efficiency or the value of the ratio of differential efficiencies for determining said driving electric current is a value calculated by said calculator on the basis of a light amount value smaller than a lower limit value of the range of light amount values set for image forming processing.

21. An image forming device according to claim 16, wherein the image forming device further comprises an announcing device for announcing that the laser beam emitting portion has deteriorated when the value of the differential efficiency has changed by a predetermined value or more from its initial value or when the value of the ratio of differential efficiencies has changed by a predetermined value or more from its initial value.

* * * * *